United States Patent
Yoeda et al.

(10) Patent No.: US 11,913,517 B2
(45) Date of Patent: Feb. 27, 2024

(54) VIBRATION DAMPER

(71) Applicant: TOYOTA JIDOSHA KABUSHIKI KAISHA, Toyota (JP)

(72) Inventors: Keiji Yoeda, Numazu (JP); Hiroyuki Amano, Susono (JP); Shingo Okaya, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/941,333

(22) Filed: Sep. 9, 2022

(65) Prior Publication Data
US 2023/0087669 A1     Mar. 23, 2023

(30) Foreign Application Priority Data

Sep. 21, 2021   (JP) .................................. 2021-153107

(51) Int. Cl.
*F16F 7/10*      (2006.01)
*F16F 15/131*    (2006.01)
*F16F 15/133*    (2006.01)

(52) U.S. Cl.
CPC ...... *F16F 15/13107* (2013.01); *F16F 15/133* (2013.01); *F16F 15/13164* (2013.01); *F16F 2222/08* (2013.01); *F16F 2232/06* (2013.01)

(58) Field of Classification Search
CPC ........... F16F 15/13107; F16F 15/13164; F16F 15/133; F16F 2222/08; F16F 2232/06; F16F 7/10; F16F 7/02; F16F 7/1022
See application file for complete search history.

(56) References Cited

U.S. PATENT DOCUMENTS

| | | | |
|---|---|---|---|
| 8,127,900 B2* | 3/2012 | Inoue | F16F 15/03 188/267 |
| 9,334,914 B2* | 5/2016 | Gartner | F16F 7/1022 |
| 10,088,006 B2* | 10/2018 | Fox | F15B 15/088 |
| 10,107,347 B2* | 10/2018 | Fox | F16F 15/073 |
| 10,352,389 B2* | 7/2019 | Fox | B64C 9/02 |
| 10,451,142 B2* | 10/2019 | Chen | H02K 49/043 |
| 11,060,582 B2* | 7/2021 | Hung | A63B 21/008 |
| 2009/0121398 A1* | 5/2009 | Inoue | B60G 17/0157 267/140.14 |
| 2013/0319807 A1* | 12/2013 | Gartner | F16F 7/1022 188/378 |
| 2017/0294828 A1* | 10/2017 | Chen | H02K 49/043 |
| 2017/0335916 A1* | 11/2017 | Fox | F15B 15/02 |

(Continued)

FOREIGN PATENT DOCUMENTS

| JP | 2007-099205 A | 4/2007 |
|---|---|---|
| JP | 2012-225482 A | 11/2012 |
| JP | 2014-196755 A | 10/2014 |

*Primary Examiner* — Thomas W Irvin
(74) *Attorney, Agent, or Firm* — Oliff PLC

(57) ABSTRACT

A vibration damper that damp vibrations transmitted between a drive unit and a support body. The vibration damper comprises: an elastic member interposed between the drive unit and the support body; a rotor supported by the drive unit or the support body; and a vibration translating mechanism that rotates the rotor and reciprocates the rotor between the drive unit and the support body, in response to the vibrations acting in a vibrating direction to isolate the drive unit and the support body away from each other and bring the drive unit and the support body closer together.

1 Claim, 13 Drawing Sheets

(56) References Cited

U.S. PATENT DOCUMENTS

| | | | |
|---|---|---|---|
| 2018/0156293 A1* | 6/2018 | Fox | F16F 15/073 |
| 2019/0003548 A1* | 1/2019 | Fox | B64C 13/40 |
| 2019/0048961 A1* | 2/2019 | Fox | F16H 19/04 |
| 2020/0023704 A1* | 1/2020 | Toyohira | B60G 17/0165 |
| 2021/0071731 A1* | 3/2021 | Hung | F16F 7/023 |

\* cited by examiner

VIBRATION DAMPER

The present disclosure claims the benefit of Japanese Patent Application No. 2021-153107 filed on Sep. 21, 2021 with the Japanese Patent Office, the disclosure of which is incorporated herein by reference in its entirety.

BACKGROUND

Field of the Disclosure

Embodiments of the present disclosure relate to the art of a vibration damper that damps vibrations by an inertial force of a mass, and more specifically, to a vibration damper that damps linear vibrations such as vertical directions by a rotary mass.

Discussion of the Related Art

Vibration dampers utilizing an inertial force are widely known in the art. For example, JP-A-2012-225482 describes a torsional vibration damper that damps torsional vibrations resulting from pulsation of an engine torque by a flywheel. In the torsional vibration damper described in JP-A-2012-225482, an input shaft connected to an engine is connected to an output member through a buffer member such as a spring damper, and the flywheel is connected to the output member through a centrifugal clutch. When an angular acceleration of the input shaft is changed from an angular acceleration of the output member by the torque pulse, a vibration damping torque is established in accordance with a difference between the angular accelerations and an inertia moment of the flywheel. According to the teachings of JP-A-2012-225482, the centrifugal clutch is released by an increase in a speed thereby disconnecting the flywheel. Consequently, an effective band of frequencies to damp the vibrations can be adjusted automatically.

As described, the torsional vibration damper taught by JP-A-2012-225482 is adapted to damp vibrations by the torque derived from the difference in angular accelerations of rotary members. Therefore, the torsional vibration damper taught by JP-A-2012-225482 may be applied only to a system in which a predetermined rotary member is vibrated. That is, the torsional vibration damper taught by JP-A-2012-225482 may not be employed to damp vibrations of e.g., an engine mount that is vibrated vertically or horizontally.

SUMMARY

Aspects of embodiments of the present disclosure have been conceived noting the foregoing technical problems, and it is therefore an object of the present disclosure to provide a vibration damper that can effectively damp vibrations reciprocating a drive unit and a support body.

According to the exemplary embodiment of the present disclosure, there is provided a vibration damper that damps vibrations transmitted between a drive unit that vibrates during power generation and a support body that supports the drive unit. In order to achieve the above-explained objective, according to the exemplary embodiment of the present disclosure, the vibration damper is provided with: an elastic member that is interposed between the drive unit and the support body; a rotary inertial mass that is supported by one of the drive unit and the support body in a rotatable manner to damp vibrations; and a vibration translating mechanism that rotates the rotary inertial mass and reciprocates the rotary inertial mass between the drive unit and the support body, in response to the vibrations acting in a vibrating direction to isolate the drive unit and the support body away from each other and bring the drive unit and the support body closer together.

In a non-limiting embodiment, the vibration translating mechanism may comprise: a support member that supports the rotary inertial mass in such a manner as to allow the rotary inertial mass to rotate around an axis along the vibrating direction, but to restrict the rotary inertial mass from reciprocating in the vibrating direction; a feed screw mechanism having a male thread and a female thread, that rotates the rotary inertial mass around the axis along the vibrating direction by a relative movement between the male thread and the female thread in the vibrating direction; a first arm section that is arranged between the support member and the one of the drive unit and the support body; and a second arm section that is arranged between one of the male thread and the female thread and the other one of the drive unit and the support body. The other one of the male thread and the female thread may be formed on the rotary inertial mass.

In a non-limiting embodiment, the support member may be joined to a leading end of the first arm section, and inserted into the rotary inertial mass while being allowed to rotate relatively to the rotary inertial mass but restricted from reciprocating relatively to the rotary inertial mass in the vibrating direction. The female thread may include a cylindrical member in which a thread groove is formed on an inner circumferential surface, and may be connected to the other one of the drive unit and the support body through the second arm section. The male thread may be formed on an outer circumferential surface of the rotary inertial mass.

In a non-limiting embodiment, the support member may include a cylindrical portion of a leading end of the second arm section. The rotary inertial mass may be held in the support member while being allowed to rotate around the axis along the vibrating direction, but restricted from reciprocating in the vibrating direction relatively to the support member. The female thread may be formed on an inner circumferential surface of the rotary inertial mass along a center axis of the rotary inertial mass, and the male thread may be formed on a leading end of the first arm section to be opposed to the female thread.

In a non-limiting embodiment, a universal joint that rotates around mutually perpendicular axes may be arranged at least any of two sites: between the first arm section and the one of the drive unit and the support body; between the first arm section and the support member; between the female thread and the second arm section; and between the second arm section and the other one of the drive unit and the support body.

In a non-limiting embodiment, the feed screw mechanism may include a ball screw mechanism in which a plurality of balls are held in thread grooves in a rotatable manner.

In a non-limiting embodiment, a lead angle of the feed screw mechanism may be narrower than 45 degrees.

In a non-limiting embodiment, the rotary inertial mass may be arranged in such a manner as to rotate around an axis perpendicular to the vibrating direction. The vibration translating mechanism may comprise a drive member that is contacted to or engaged with the rotary inertial mass. The drive member may be reciprocated by the drive unit and the support body being isolated away from each other and brought closer together by the vibrations, thereby applying a torque to the rotary inertial mass to rotate the rotary inertial mass.

In a non-limiting embodiment, the drive member may comprise: a first arm section that extends from the one of the drive unit and the support body toward the rotary inertial mass while being contacted to or engaged with the rotary inertial mass; a first joint member that keeps the first arm section to be contacted to or engaged with the rotary inertial mass while allowing the first arm section to reciprocate on the rotary inertial mass in the vibrating direction; a second arm section that extends from the other one of the drive unit and the support body toward the rotary inertial mass on an opposite side of the rotary inertial mass to the first arm section, while being contacted to or engaged with the rotary inertial mass; and a second joint member that keeps the second arm section to be contacted to or engaged with the rotary inertial mass while allowing the second arm section to reciprocate on the rotary inertial mass in the vibrating direction.

In a non-limiting embodiment, the first arm section may be connected to the one of the drive unit and the support body through a universal joint that rotates around mutually perpendicular axes. The second arm section may be connected to the other one of the drive unit and the support body through a hinge that rotates around an axis perpendicular to a rotational center axis of the rotary inertial mass.

In a non-limiting embodiment, the drive member may comprise: a first arm section that extends from the one of the drive unit and the support body toward the rotary inertial mass while being contacted to or engaged with the rotary inertial mass; the second arm section that extends from the other one of the drive unit and the support body toward the rotary inertial mass on a diametrically opposite side of the rotary inertial mass to the first arm section, while being contacted to or engaged with the rotary inertial mass; and a holding member that holds the first arm section and the second arm section while allowing to reciprocate on the rotary inertial mass. The holding member may be attached to the rotary inertial mass while being allowed to rotate relatively to the rotary inertial mass.

In a non-limiting embodiment, the first arm section may be connected to the one of the drive unit and the support body through a first universal joint that rotates around mutually perpendicular axes. The second arm section may be connected to the other one of the drive unit and the support body through a second universal joint that rotates around mutually perpendicular axes.

In a non-limiting embodiment, the rotary inertial mass may comprise a pair of rotors rotating around axes parallel to each other and individually perpendicular to the vibrating direction. The vibration translating mechanism may comprise: a first arm section that is inserted between the rotors while being contacted to or engaged with the rotors, and that reciprocates in the vibrating direction thereby rotating the rotors; and a second arm section having two branches that pushes the rotors onto the first arm section, and that reciprocates in the vibrating direction thereby rotating the rotors. One of the first arm section and the second arm section may be connected to the drive unit, and the other one of the first arm section and the second arm section may be connected to the support body.

In a non-limiting embodiment, the one of the first arm section and the second arm section may be connected to the drive unit through a first universal joint that rotates around mutually perpendicular axes. The other one of the first arm section and the second arm section may be connected to the support body through a second universal joint that rotates around mutually perpendicular axes.

In a non-limiting embodiment, the rotary inertial mass may be rotatably supported by a first arm section extending from the one of the drive unit and the support body in the vibrating direction. The vibration translating mechanism may comprises: a second arm section extending from the other one of the drive unit and the support body in the vibrating direction while being contacted to or engaged with an outer circumferential surface of the rotary inertial mass; a lever member extending diagonally across the second arm section, in which one end is connected to the first arm section in a pivotal manner; a roller member that is attached to the other end of the lever member in such a manner as to rotate around an axis parallel to a rotational center axis of the rotary inertial mass; and an elastic ember that applies a torque to the lever member to push the rotary inertial mass onto one side of the second arm section and to push the roller member onto the other side of the second arm section.

In a non-limiting embodiment, the first arm section may be connected to the one of the drive unit and the support body through a universal joint that rotates around mutually perpendicular axes. The second arm section may be connected to the other one of the drive unit and the support body through a hinge that rotates around an axis perpendicular to the rotational center axis of the rotary inertial mass.

In a non-limiting embodiment, the rotary inertial mass may be rotatably supported by a first arm section extending from the one of the drive unit and the support body in the vibrating direction. The first arm section may be connected to the one of the drive unit and the support body through a universal joint that rotates around mutually perpendicular axes. The vibration translating mechanism may comprise: a second arm section extending from the other one of the drive unit and the support body in the vibrating direction while being contacted to or engaged with an outer circumferential surface of the rotary inertial mass; and a selective engaging mechanism that rotates the first arm section in a direction to push the rotary inertial mass onto the second arm section, or in a direction to detach the rotary inertial mass from the second arm section.

In the vibration damper according to the exemplary embodiment of the present disclosure, the vibrations isolating the drive member and the support body and bringing the drive unit and the support body closer together are damped by an elastic force of the elastic member interposed between the drive unit. In this situation, the vibration translating mechanism rotates the rotary inertial mass in response to the relative displacements of the drive unit and the support body being isolated away from each other and brought closer together. Consequently, the vibrations are damped by a vibration damping torque established in accordance with an angular acceleration and an inertia moment. That is, the linear vibrations isolating the drive unit and the support body away from each other and bringing the drive unit and the support body closer together may be absorbed by a rotation of the rotary inertial mass.

In the vibration damper having the feed screw mechanism, the rotary inertial mass is rotated and reciprocated along its center axis certainly by the feed screw mechanism in response to the vibrations. Therefore, the vibrations can be damped effectively by inertia moments derived from such rotary motion and translational motion of the rotary inertial mass.

In the vibration damper according to the exemplary embodiment of the present disclosure, the arm sections connecting the rotary inertial mass or the feed screw mechanism to the drive unit and the support body may be connected to the drive unit and the support body through universal joints. Therefore, even if the drive unit and the support body are displaced in a direction different from the direction of the vibrations isolating the drive unit and the support body away from each other and bringing the drive unit and the sport body closer together, the drive unit and the support body will not be subjected to reaction forces derived from such displacement. For this reason, the vibration damping performance of the vibration damper may be ensured.

Further, the rotary inertial mass may be arranged to rotate around the axis perpendicular to the direction of the vibrations isolating the drive unit and the support body away from each other and bringing the drive unit and the support body closer together, and may be rotated by the drive member reciprocating tangentially with respect to the rotary inertial mass. In this case, the rotary inertial mass is rotated and reciprocated along drive member. Therefore, the vibrations can be damped effectively by an inertial force acting not only in a rotational direction of the rotary inertial mass but also in a reciprocating direction of the rotary inertial mass.

In this case, the arm section serving as the drive member may also be connected to the drive unit or the support body through the universal joint. Therefore, even if the rotary inertial mass is displaced relatively in a direction different from the direction of the vibrations isolating the drive unit and the support body away from each other and bringing the drive unit and the sport body closer together, the drive unit and the support body will not be subjected to reaction forces derived from such displacement. For this reason, the vibration damping performance of the vibration damper may be ensured.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIGS. 3A and 3B are schematic illustrations showing a second example of the vibration damper according to the present disclosure, in which FIG. 3A shows a situation where a drive unit and a body are isolated from each other and brought closer to each other, and FIG. 3B shows a situation where the drive unit and a body are displaced relatively in a lateral direction or vertical direction;

FIGS. 4A and 4B are schematic illustrations showing modifications of the second example, in which FIG. 4A shows an example in which universal joints are arranged on a first arm section, and FIG. 4B shows an example in which the universal joints are arranged on a second arm section;

FIGS. 7A, 7B, and 7C are schematic illustrations showing a structure of the vibration damper according to the fourth example in more detail, in which FIG. 7A shows a situation where the drive unit and the body are isolated from each other and brought closer to each other, and FIGS. 7B and 7C show situations where the drive unit and the body are displaced relatively in the lateral direction and the vertical direction;

FIGS. 8A and 8B are partial views showing one example of a joint member, in which FIG. 8A is a front view of the joint member, and FIG. 8B is a cross-sectional view of the joint member;

FIGS. 9A and 9B are partial views showing another example of the joint member, in which FIG. 9A is a front view of the joint member, and FIG. 9B is a cross-sectional view of the joint member;

FIGS. 10A and 10B are schematic illustrations showing a modification of the example shown in FIG. 7, in which FIG. 10A shows a situation where the drive unit and the body are isolated from each other and brought closer to each other, and FIG. 10B shows a situation where the drive unit and the body are displaced relatively in the lateral direction or the vertical direction;

FIGS. 11A and 11B are partial views showing one example of a holding member shown in FIG. 10, in which FIG. 11A is a front view of the joint member, and FIG. 11B is a cross-sectional view of the joint member;

FIGS. 12A and 12B are partial views showing another example of the holding member shown in FIG. 10, in which FIG. 12A is a front view of the joint member, and FIG. 12B is a cross-sectional view of the joint member;

FIGS. 13A and 13B are partial views showing still another example of the holding member shown in FIG. 10, in which FIG. 13A is a front view of the joint member, and FIG. 13B is a cross-sectional view of the joint member;

FIGS. 18A and 18B are schematic illustrations showing an eighth example of the vibration damper according to the present disclosure, in which FIG. 18A is a plan vie of a torque rod, and FIG. 18B is a cross-sectional view of the torque rod;

DETAILED DESCRIPTION OF THE PREFERRED EMBODIMENT(S)

Embodiments of the present disclosure will now be explained with reference to the accompanying drawings. Note that the embodiments shown below are merely examples of the present disclosure which should not limit a scope of the present disclosure.

First Example

Figure 1:
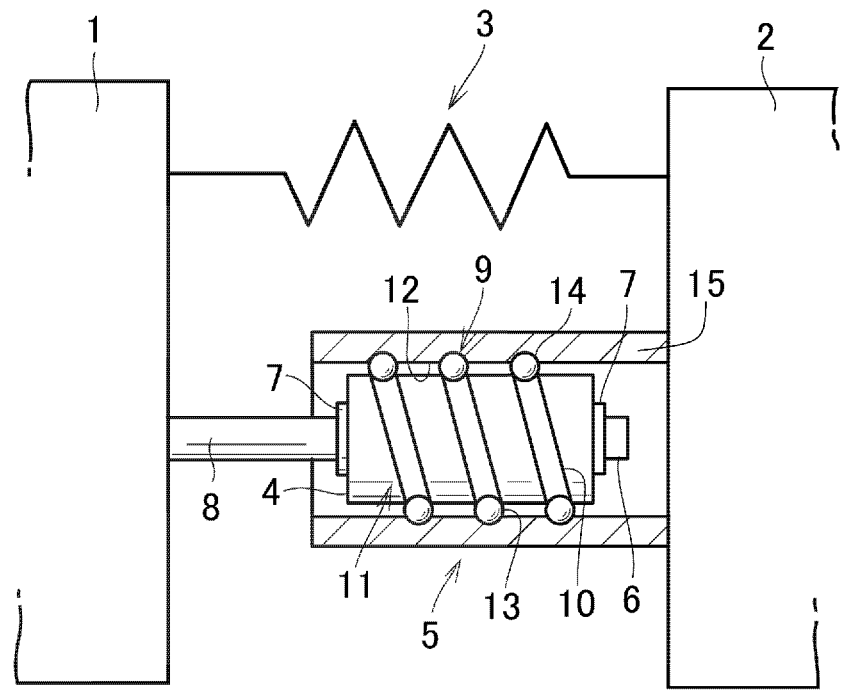
FIG. 1 is a schematic illustration showing a first example of the vibration damper according to the present disclosure.

Turning to FIG. 1, there is shown a first example of the vibration damper according to the present disclosure. According to the first example, the vibration damper is adapted to damp vibrations acting between a drive unit 1 such as an internal combustion engine and a support body (hereinafter, simply referred to as the "body") 2 supporting the drive unit 1. As well known in the art, the internal combustion engine is vibrated during power generation. In order to damp the vibrations, an elastic member 3 such as an engine mount comprising a rubber member and a spring is interposed between the drive unit 1 and the body 2.

In order to establish an inertial force for damping vibrations, a rotary inertial mass (also referred to as the "rotor") 4 is also interposed between the drive unit 1 and the body 2. Specifically, the rotor 4 is supported by a vibration translating mechanism 5, and the rotor 4 is allowed to rotate while moving translationally. The vibration translating mechanism 5 translates a force isolating the drive unit 1 and the body 2 away from each other and bringing the drive unit 1 and the body 2 closer together into a rotary-translational motion of the rotor 4. In other words, the vibration translating mechanism 5 translates a force acting in a vibrating direction into a rotary-translational motion of the rotor 4. According to the first example shown in FIG. 1, the rotor 4 is held in the vibration translating mechanism 5 while being allowed to rotate and reciprocate in the vibrating direction. Specifically, a support shaft 6 extending along a rotational center of the rotor 4 is inserted into the rotor 4 to support the rotor 4 in a rotatable manner, and the rotor 4 is fixed to the support shaft 6. That is, the rotor 4 is not allowed to move relatively to the support shaft 6 in an axial direction (i.e., in the vibrating direction). In order to restrict an axial movement of the rotor 4, a pair of flanges 7 is arranged on both axial ends of the rotor 4. For example, the flange 7 may be formed not only integrally with the support shaft 6, but a stopper ring such as a C-ring and a E-ring may also be adopted as the flange 7.

In order to apply a force to drive unit 1 and the body 2 in the vibrating direction, a first arm section 8 of the support shaft 6 is connected to any one of the drive unit 1 and the body 2. According to the first example, specifically, the first arm section 8 is formed integrally with one of leading ends of the support shaft 6 and connected to the drive unit 1 so that the support shaft 6 extends from the drive unit 1 toward the rotor 4.

The rotor 4 is rotated by a feed screw mechanism 9. If a friction acting in the feed screw mechanism 9 is large, a vibration damping performance of the vibration damper will be reduced. Therefore, in order to reduce the friction in the feed screw mechanism 9 as much as possible, a ball screw mechanism is adopted as the feed screw mechanism 9 in the first example. Specifically, a thread groove 10 as a spiral groove is formed on an outer circumferential surface of the rotor 4 so that the outer circumferential surface of the rotor 4 serves as a male thread 11. Whereas, a thread groove 13 is formed on an inner circumferential surface of a cylindrical member holding the rotor 4 therein so that the inner circumferential surface of the cylindrical member serves as a female thread 12. The thread groove 10 and the thread groove 13 are opposed to each other, and each of the thread groove 10 and the thread groove 13 has an arcuate cross-sectional shape. Therefore, balls 14 as steel balls may be held between the thread groove 10 and the thread groove 13 in a rotatable manner. That is, the male thread 11 and the female thread 12 are engaged with each other through the balls 14.

The female thread 12 is connected to the body 2 through a second arm section 15. According to the first example, the second arm section 15 is formed integrally with one of leading ends of the cylindrical member serving as the female thread 12.

Figure 2:
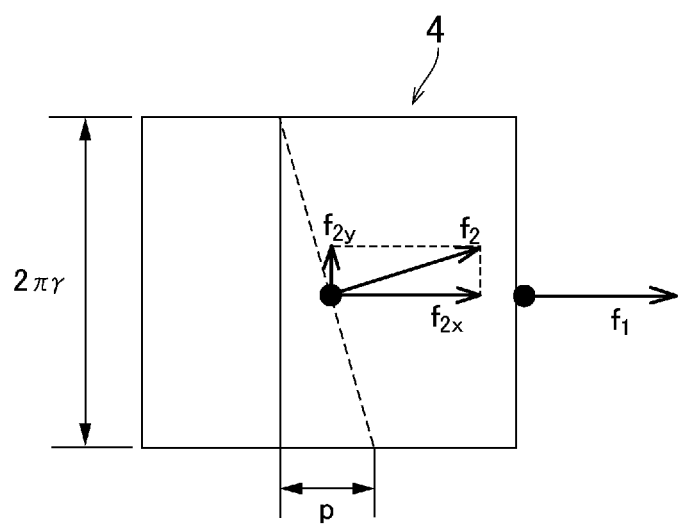
FIG. 2 is an explanatory diagram showing a force applied to a rotor.

Next, here will be explained a vibration damping action of the vibration damper. Turning to FIG. 2, there is shown a force applied to the rotor 4 in a situation where the drive unit 1 vibrates. A motion of the rotor 4 in this situation may be expressed by the following equations of motion.

$$m\ddot{x}_3 = f_1 + f_{2x}, \quad I\ddot{\theta}_3 = rf_{2y}$$

In FIG. 2, $f_1$ is a force applied to the rotor 4 from the drive unit 1, $f_2$ is a force applied to the rotor 4 from the body 2, $f_{2x}$ is a component of the force $f_2$ in the axial direction, $f_{2y}$ is a component of the force $f_2$ in the rotational direction, r is a force application radius of the rotor 4, and p is a pitch (or lead) of the feed screw mechanism 9. Whereas, in the above equations of motion, m is a mass of the rotor 4, $x_3$ two dots ($d^2x_3/dt^2$) is a center-of-mass acceleration of the rotor 4, I is an inertia moment of the rotor 4, and $\theta_3$ two dots ($d^2\theta_3/dt^2$) is an angular acceleration around a center of mass of the rotor 4.

An acceleration and an angular acceleration of the rotor 4 may be expressed by the following relational expressions:

$$\ddot{x}_2 - \ddot{x}_1 = \frac{p}{2\pi r} r\ddot{\theta}_3, \quad \ddot{x}_1 = \ddot{x}_3 \frac{f_{2y}}{f_{2x}} = \frac{p}{2\pi r}$$

where $x_1$ two dots ($d^2x_1/dt^2$) is an acceleration of the drive unit 1, and $x_2$ two dots ($d^2x_2/dt^2$) is an acceleration of the body 2. As described, the drive unit 1 and the body 2 are allowed to isolate away from each other and to get closer to each other. Accordingly, a difference between a displacement $x_1$ of the drive unit 1 and a displacement $x_2$ of the body 2 in the vibrating direction and a difference between the accelerations of the drive unit 1 and the body 2 derived from such difference between the displacements appears as a rotation and an angular acceleration of the rotor 4. Since the drive unit 1 and the rotor 4 are integrated with ach other in the vibrating direction, acceleration of the drive unit 1 and the rotor 4 in the vibrating direction are identical to each other. In addition, a ratio between the component $f_{2x}$ of the force $f_2$ in the axial direction and the component $f_{2y}$ of the force $f_2$ in the rotational direction is identical to a ratio between a circumferential length $2\pi r$ of the rotor 4 and the pitch p.

Accordingly, the force $f_1$ applied to the rotor 4 from the drive unit 1, and the force $f_{2x}$ of applied to the rotor 4 from the body 2 in the vibrating direction may be expressed as the following equations.

$$f_1 = m\ddot{x}_1 - \frac{4\pi^2 I}{p^2}(\ddot{x}_2 - \ddot{x}_1)$$

$$f_{2x} = \frac{4\pi^2 I}{p^2}(\ddot{x}_2 - \ddot{x}_1)$$

Simple harmonic motions of the drive unit 1 and the body 2 at an angular velocity ω with respect to the displacement $x_1$ of the drive unit 1 and the displacement $x_2$ of the body 2 in the vibrating direction may be temporarily expressed as the following equations.

$$\ddot{x}_1 = -\omega^2 x_1, \quad \ddot{x}_2 = -\omega^2 x_2$$

Accordingly, a force Fe received by the drive unit 1 and a force Fb received by the body 2 may be expressed as the following expressions:

$$F_e = -f_1 - k(x_1 - x_2)$$
$$= \left\{\left(m + \frac{4\pi^2 I}{p^2}\right)\omega^2 - k\right\}x_1 +$$
$$\left(-\frac{4\pi^2 I}{p^2}\omega^2 + k\right)x_2$$

$$F_b = -f_{2x} + k(x_1 - x_2)$$
$$= \left(-\frac{4\pi^2 I}{p^2}\omega^2 + k\right)x_1 +$$
$$\left(\frac{4\pi^2 I}{p^2}\omega^2 - k\right)x_2$$

where k is a spring constant of the elastic member 3. The above-expressions may be transformed into the following determinant:

$$\binom{F_e}{F_b} = \left\{m\omega^2\begin{pmatrix}1 & 0\\ 0 & 0\end{pmatrix} + \left(\frac{4\pi^2 I\omega^2}{p^2} - k\right)\begin{pmatrix}1 & -1\\ -1 & 1\end{pmatrix}\right\}\binom{x_e}{x_b}$$

where $x_e$ is a displacement of the drive unit 1, and $x_b$ is a displacement of the body 2.

In the above determinant, the first matrix in the curly brackets expresses an inertia moment derived from the translational motion of the rotor 4. In the first matrix, both of the lower numbers are zero. This means that the force received by the body 2 is zero, that is, the force vibrating the body 2 is eliminated. This is because the support shaft 6 as a support member of the embodiment is connected to the drive unit 1. Here, the force which cannot be canceled completely by the inertial force increases in proportional to the mass m of the rotor 4. From this point of view, it is preferable to lighten the mass m of the rotor 4 as much as possible.

In the above determinant, the second matrix in the curly brackets expresses a relative displacement between the drive unit 1 and the body 2. That is, given that a value of the coefficient in the brackets is zero, a transfer force of the elastic member 3 will be canceled by the inertial force of the rotor 4 thereby preventing transmission of vibrations to the body 2. Specifically, in order to damp vibrations, a load acting in the vibrating direction around a predetermined angular velocity ω may be reduced by adjusting the inertia moment I of the rotor 4 and the pitch (or lead) p of the feed screw mechanism 9 in relation to the spring coefficient k of the elastic member 3. As a result, the vibrations will be damped.

Thus, according to the first example of the present disclosure, the rotor 4 is rotated and moved linearly by the force derived from the vibrations isolating the drive unit 1 and the body 2 away from each other and bringing the drive unit 1 and the body 2 closer together, and such vibrations are damped by the inertia moment derived from the rotary motion and translational motion of the rotor 4.

Here will be explained a lead angle of the feed screw mechanism 9 as a relation between the pitch p and the circumferential length of the rotor 4. The inertia moment I by which a value of the coefficient of the second matrix inside the brackets in the above-explained determinant is adjusted to zero may be expressed as:

$$4\pi^2 I\omega^2/p^2 = k$$

$$I = (kd^2/4\omega^2)*(p/\pi d)^2$$

where ω is an input angular velocity, and d is a diameter of the rotor 4. In the above expression, I is the inertia moment possible to cancel a spring force of the elastic member 3 whose spring coefficient is k. Accordingly, given that the pitch (or lead) p is shorter than the circumferential length πd, a ratio therebetween will be reduced less than 1 so that the force transmitted through the elastic member 3 will be canceled effectively. Specifically, it is preferable to set the lead angle of the feed screw mechanism 9 as a relation between the pitch p and the circumferential length πd narrower than 45 degrees.

Second Example

Next, a second example of the vibration damper according to the present disclosure will be explained with reference to FIGS. 3A and 3B. In the following descriptions, common reference numerals are assigned to the elements in common with those of the first example, and detailed explanations for the common elements will be omitted.

As described, the vibration damper according to the present disclosure is adapted to damp the vibrations isolating the drive unit 1 and the body 2 away from each other and bringing the drive unit 1 and the body 2 closer together. Nonetheless, the drive unit 1 and the body 2 are also vibrated in other directions e.g., in the lateral direction. Therefore, it is desirable to prevent the rotor 4 from being subjected to a load derived from the vibrations in the lateral direction. To this end, according to the second example, the first arm section 8 is connected to the drive unit 1 through a universal joint 16. On the other hand, according to the second example, a shaft is adopted as the second arm section 15. Specifically, one of the second arm section 15 is connected to the female thread 12 as a cylindrical member, and the other end of the second arm section 15 is connected to the body 2 through a universal joint 17. For example, a conventional universal joint in which input and output shafts are allowed to rotate around mutually perpendicular axes may be adopted as the universal joints 16 and 17.

Figure 3A:
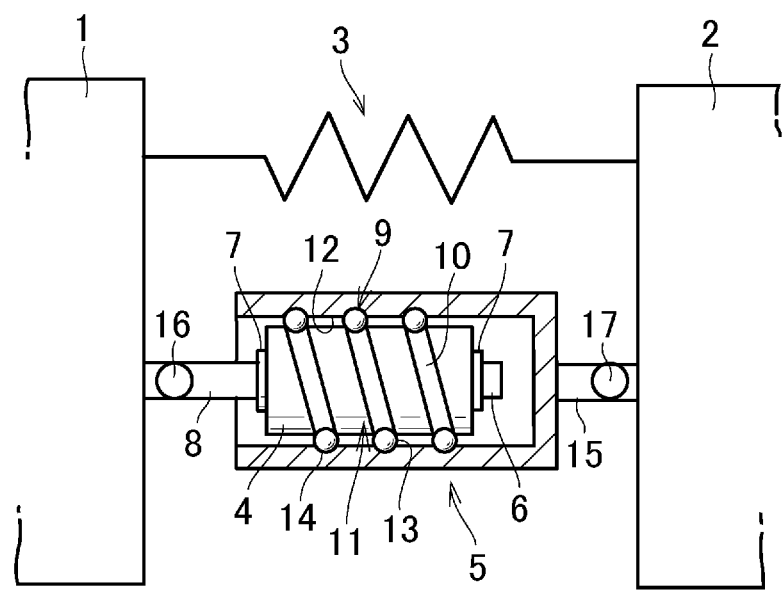
Figure 3B:
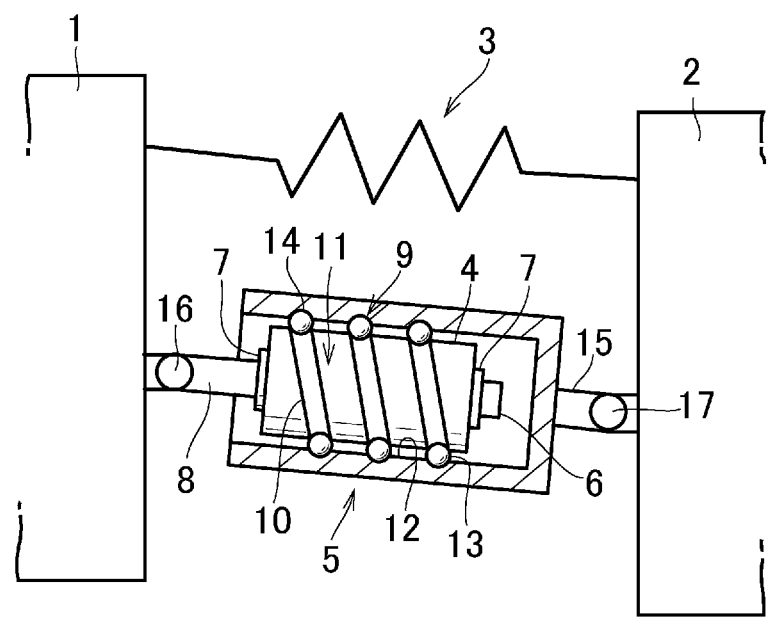

FIG. 3A shows a situation in which the drive unit 1 and the body 2 are displaced only in the direction to be isolated from each other and to get closer to each other. In this situation, the first arm section 8 and the second arm section 15 are not subjected to bending stresses. Whereas, FIG. 3B shows a situation in which the drive unit 1 and the body 2 are displaced relatively in the lateral direction (i.e., the vertical direction in FIGS. 3A and 3B). In this situation, the first arm section 8 is bent at the universal joint 16, and the second arm section 15 is bent at the universal joint 17. Consequently, the load and the stress acting between the drive unit 1 and the first arm section 8 are absorbed by a rotation of the universal joint 16, and the load and the stress acting between the body 2 and the second arm section 15 are absorbed by a rotation of the universal joint 16. Thus, the vibration damper according to the second example does not transmit the load derived from the vibrations in the lateral direction between the drive unit 1 and the body 2. According to the second example, therefore, the vibration in the lateral direction may also be damped. In addition, since the first arm section 8 and the second arm section 15 are not subjected to the bending stresses, damages of the first arm section 8 and the second arm section 15 may be limited.

Figure 4A:
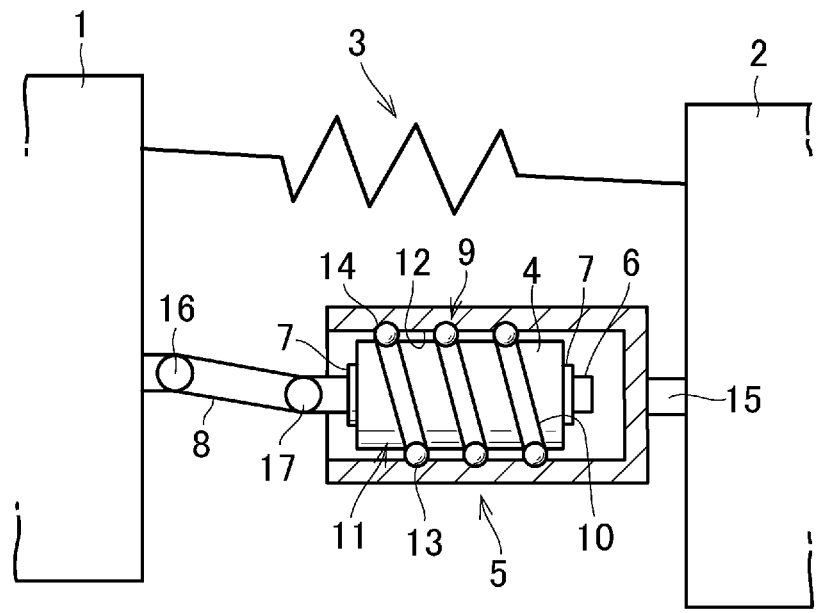
Figure 4B:
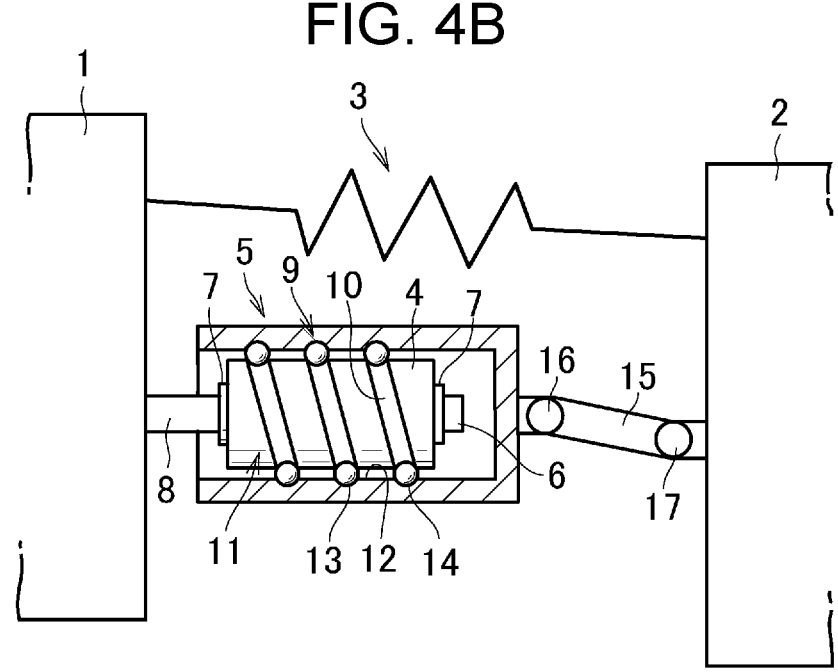

Turning to FIGS. 4A and 4B, there are shown modification examples of the second example in which arrangement of the universal joints 16 and 17 are altered. For example, as illustrated in FIG. 4A, the universal joint 16 may be arranged between the drive unit 1 and the first arm section 8, and the universal joint 17 may be arranged between the first arm section 8 and the support shaft 6 (or the male thread 11). Otherwise, as illustrated in FIG. 4B, the universal joint 16 may also be arranged between the female thread 12 and the body 2, and the universal joint 17 may also be arranged between the second arm section 15 and the body 2.

According to the modification examples, the first arm section 8 or the second arm section 15 is bent at the universal joints 16 and 17 when the drive unit 1 and the body 2 are displaced relatively in the lateral direction. Therefore, the load derived from the displacements of the drive unit 1 and the body 2 may be absorbed by such bending motion of the first arm section 8 or the second arm section 15 thereby damping the vibration acting in the lateral direction. However, if the second arm section 15 is fixed to the body 2 as illustrated in FIG. 4A, or if the first arm section 8 is fixed to the drive unit 1 as illustrated in FIG. 4B, a fixed end of the arm section will be subjected to a bending stress. For this reason, it is desirable to employ the structures shown in FIGS. 3A and 3B so as to limit damage on the first arm section 8 or the second arm section 15.

Third Example

Figure 5:
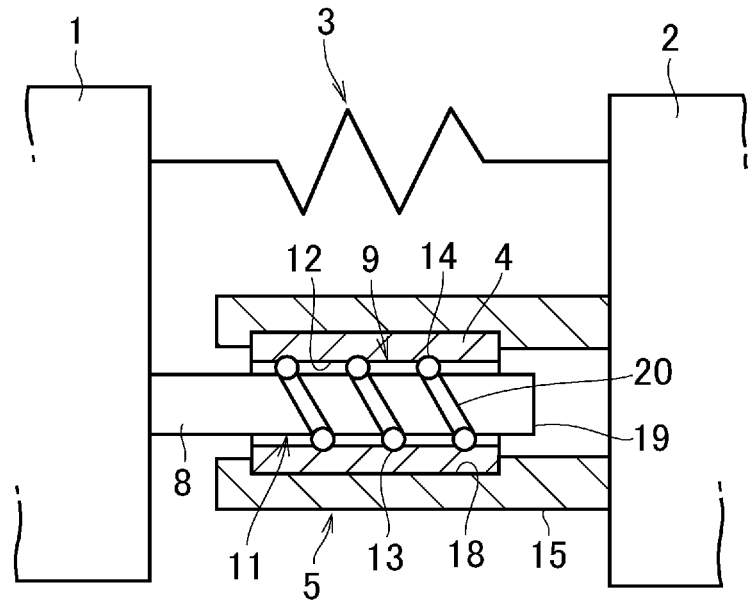
FIG. 5 is a schematic illustration showing a third example of the vibration damper according to the present disclosure.

Turning to FIG. 5, there is shown a third example of the vibration damper in which the rotor 4 is restricted from moving in the vibrating direction by the body 2. According to the third example, the second arm section 15 is shaped into a cylinder, and the second arm section 15 extends from the body 2 toward the drive unit 1. In the second arm section 15, a holding space 18 is formed on the inner circumferential surface of a leading end section. An inner diameter of the holding space 18 is slightly larger than an outer diameter of the rotor 4 so that the rotor 4 is held in the holding space 18 while being allowed to rotate therein. That is, an inner diameter of the second arm section 15 at a section adjacent to the holding space 18 is smaller than the inner diameter of the holding space 18. Therefore, the rotor 4 is allowed to rotate in the holding space 18 but restricted from moving relatively to the body 2 in the vibrating direction. In this case, since the inner diameter of the second arm section 15 at an opening end is smaller than outer diameter of the rotor 4, the rotor 4 may not be inserted smoothly into the second arm section 15. Therefore, in order to fit the rotor 4 into the holding space 18, the second arm section 15 may be divided along its rotational center axis into two parts. Otherwise, an opening end of the holding space 18 may be closed by a separate member such as an end plate (not shown). In the third example, accordingly, the leading end section of the second arm section 15 serves as the support member.

According to the third example, a cylindrical member is adopted as the rotor 4, and the thread groove 13 is formed on an inner circumferential surface of the rotor 4 so that the inner circumferential surface of the rotor 4 serves as the female thread 12. A threaded shaft 19 is inserted into the rotor 4, and a thread groove 20 is formed on an outer circumferential surface of the threaded shaft 19 so that the outer circumferential surface of the threaded shaft 19 serves as the male thread 11. The thread groove 20 and the thread groove 13 are opposed to each other, and each of the thread groove 20 and the thread groove 13 has an arcuate cross-sectional shape. Therefore, the balls 14 are held between the thread groove 20 and the thread groove 13 in a rotatable manner. That is, the male thread 11 and the female thread 12 are engaged with each other through the balls 14. The threaded shaft 19 is joined to the first arm section 8 extending from the drive unit 1 toward the body 2. In other words, a leading end section of the first arm section 8 serves as the threaded shaft 19.

According to the third example, when the drive unit 1 and the body 2 are brought closer together, the threaded shaft 19 on which the male thread 11 is formed is inserted into the rotor 4 on which the female thread 12 is formed. By contrast, when the drive unit 1 and the body 2 are isolated the away from each other, the threaded shaft 19 is withdrawn from the rotor 4. In those situations, the rotor 4 is rotated around the threaded shaft 19 by the action of the ball screw mechanism. Specifically, since the rotor 4 is supported by the body 2 through the second arm section 15, the drive unit 1 is reciprocated in the vibrating direction relatively to the rotor 4. That is, an inertial force of the rotor 4 is applied to the drive unit 1 in the vibrating direction. Consequently, as explained in the foregoing examples, the rotor 4 is rotated and moved linearly with respect to the drive unit 1.

In other words, the vibration damper shown in FIG. 5 has a structure opposite to the structure of the vibration damper according to the first example. Accordingly, in the vibration damper shown in FIG. 5, a force Fe received by the drive unit 1 and a force Fb received by the body 2 may be expressed by the following determinant.

$$\begin{pmatrix} F_e \\ F_b \end{pmatrix} = \left\{ m\omega^2 \begin{pmatrix} 0 & 0 \\ 0 & 1 \end{pmatrix} + \left( \frac{4\pi^2 I \omega^2}{p^2} - k \right) \begin{pmatrix} 1 & -1 \\ -1 & 1 \end{pmatrix} \right\} \begin{pmatrix} x_e \\ x_b \end{pmatrix}$$

As can be seen from the above determinant, according to the third example, the inertial force derived from the rotary motion and the translational motion of the rotor 4 may also be utilized as a vibration damping force. Specifically, the rotor 4 is rotated and moved linearly by the force derived from the vibrations isolating the drive unit 1 and the body 2 away from each other and bringing the drive unit 1 and the body 2 closer together, and the vibrations may be damped by the inertial force of the rotor 4 derived from the rotary motion and translational motion of the rotor 4. In the above determinant, there is "1" in the lower sequence of the first matrix enclosed by an ellipse. This means that the body 2 is subjected to the force to a certain extent. That is, since the force applied to the body 2 is increased, the vibration damping performance of the vibration damper according to the third example is reduced compared to the first example.

Fourth Example

Figure 6:
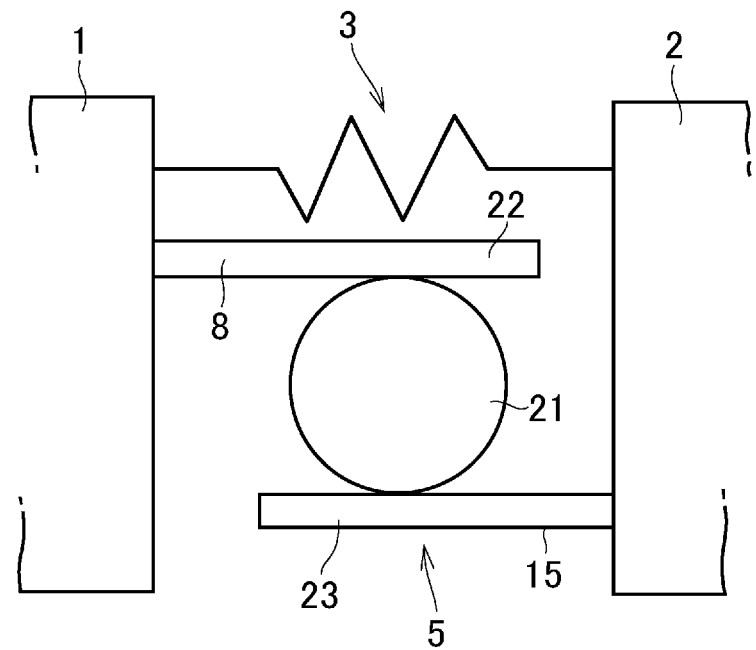
FIG. 6 is a schematic illustration showing a fourth example of the vibration damper according to the present disclosure.

Turning to FIG. 6, there is schematically shown a structure of the vibration damper according to a fourth example. According to the fourth example, a rotor 21 as a rotary inertial mass rotates around an axis perpendicular to the vibrating direction in which the drive unit 1 and the body 2 are isolated the away from each other and brought closer together. That is, the vibration damper according to the fourth example has a structure similar to a rack-and-pinion mechanism. Specifically, the vibration damper according to the fourth example comprises a pair of drive members 22 and 23. Each of the drive members 22 and 23 is contacted to or engaged with the rotor 21 so that the rotor 21 is rotated by a reciprocating motion of the drive member 22 or 23. For example, the drive members 22 and 23 may be contacted to an outer circumferential surface of the rotor 21 in such a manner as to transmit torque to the rotor 21. Instead, as a rack-and-pinion mechanism, gear tooth may be formed on contact surfaces of the drive members 22 and 23 and the outer circumferential surface of the rotor 21.

Specifically, the drive member 22 is joined to the leading end of the first arm section 8 connected to the drive unit 1. In other words, the leading end section of the first arm section 8 connected to the drive unit 1 serves as the drive member 22 so that the drive member 22 is reciprocated by a displacement of the drive unit 1 in the vibrating direction. On the other hand, the drive member 23 is joined to the leading end of the second arm section 15 connected to the body 2. In other words, the leading end section of the second arm section 15 connected to the body 2 serves as the drive member 23 so that the drive member 23 is reciprocated by a displacement of the body 2 in the vibrating direction.

In the vibration damper shown in FIG. 6, the drive members 22 and 23 being contacted to or engaged with the rotor 21 are reciprocated tangentially when the drive unit 1 and the body 2 are displaced in the direction to be isolated from each other and to get closer to each other. As a result, the rotor 21 is rotated around the axis perpendicular to the vibrating direction of the drive unit 1 and the body 2 to reciprocate between the drive unit 1 and the body 2. That is, the rotor 21 is rotated while being reciprocated linearly between the drive unit 1 and the body 2. Specifically, in the vibration damper shown in FIG. 6, a force Fe received by the drive unit 1 and a force Fb received by the body 2 may be expressed by the following determinant:

$$\begin{pmatrix} F_e \\ F_b \end{pmatrix} = \left\{ \frac{m\omega^2}{4} \begin{pmatrix} 1 & 1 \\ 1 & 1 \end{pmatrix} + \left( \frac{I\omega^2}{4r^2} - k \right) \begin{pmatrix} 1 & -1 \\ -1 & 1 \end{pmatrix} \right\} \begin{pmatrix} x_e \\ x_b \end{pmatrix}$$

where r is a radius of the rotor 21.

As can be seen from the above determinant, according to the fourth example, the inertial force derived from the translational motion of the rotor 21 may also be utilized as a vibration damping force. Specifically, the rotor 21 is rotated and moved linearly by the force derived from the vibrations isolating the drive unit 1 and the body 2 away from each other and bringing the drive unit 1 and the body 2 closer together, and the vibrations may be damped by the inertial force of the rotor 21 derived from the rotary motion and translational motion of the rotor 21. In the above determinant, both numbers in the lower sequence of the first matrix enclosed by an ellipse are "1". This means that the body 2 is subjected to the force to a certain extent. That is, since the force applied to the body 2 is increased, the vibration damping performance of the vibration damper according to the fourth example is reduced compared to the first example.

Figure 7A:
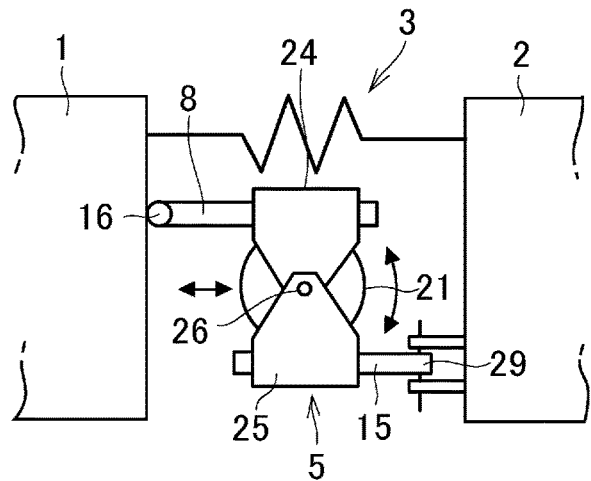
Figure 7B:
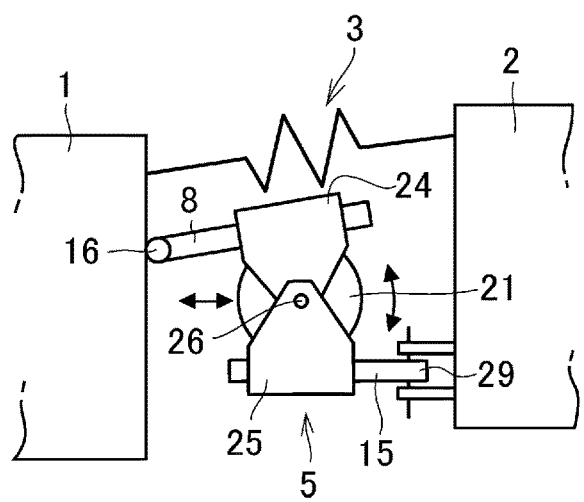
Figure 7C:
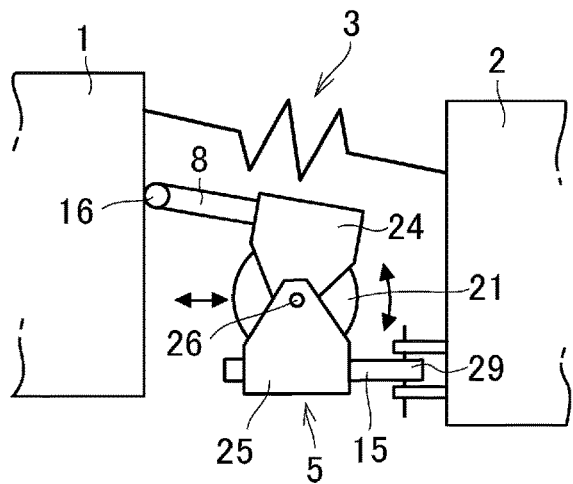

The structure of the vibration damper according to the fourth example is shown in FIGS. 7A, 7B, and 7C in more detail. As described, the drive unit 1 and the body 2 are vibrated not only in the vibrating direction isolating the drive unit 1 and the body 2 away from each other and bringing the drive unit 1 and the body 2 closer together, but also in the lateral direction. Therefore, it is necessary to keep the drive members 22 and 23 to be contacted to or engaged with the rotor 21 even when the drive unit 1 and the body 2 are vibrated in the lateral direction. To this end, according to the example shown in FIGS. 7A, 7B, and 7C, the first arm section 8 serves as the drive member 22, and the first arm section 8 is connected to a joint member 24 that keeps the first arm section 8 to be contacted to or engaged with the outer circumferential surface of the rotor 21. Likewise, the second arm section 15 serves as the drive member 23, and the second arm section 15 is connected to a joint member 25 that keeps the second arm section 15 to be contacted to or engaged with the outer circumferential surface of the rotor 21.

Figure 8A:
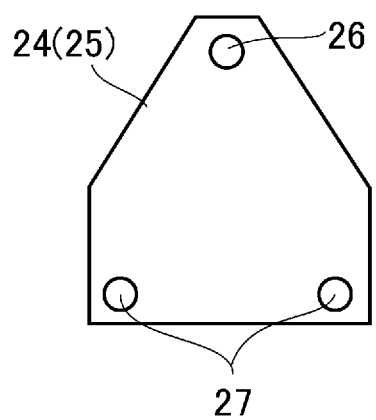
Figure 8B:
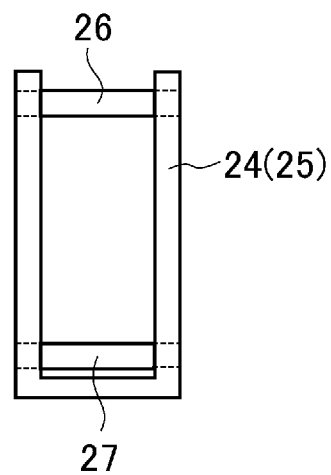
Figure 9A:
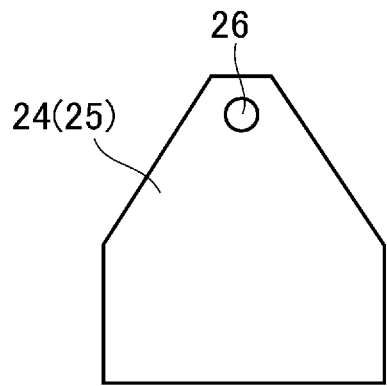
Figure 9B:
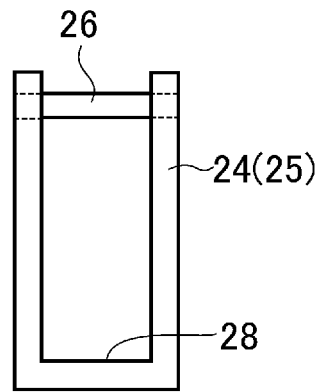

For example, the joint member 24 has a U-shaped cross-section to cover the first arm section 8 from an outer side, and attached to a rotational center of the rotor 21 in a pivotal manner by a pin 26. Likewise, the joint member 25 also has a U-shaped cross-section to cover the second arm section 15 from an outer side, and also attached to the rotational center of the rotor 21 in a pivotal manner by the pin 26. That is, a width of a holding space of the joint member 24 is slightly wider than a width of the first arm section 8 and a thickness of the rotor 21, and, a width of a holding space of the joint member 25 is slightly wider than a width of the second arm section 15 and the thickness of the rotor 21. In the joint member 24, a surface of the first arm section 8 opposite to the rotor 21 comes into contact to a contact surface of the joint member 24. Likewise, in the joint member 25, a surface of the second arm section 15 opposite to the rotor 21 comes into contact to a contact surface of the joint member 25. Therefore, as illustrated in FIGS. 8A and 8B, a plain bearing 27 may be arranged in the holding space of the joint member 24 in the vicinity of the contact surface, so as to reduce a frictional resistance between the first arm section 8 and the contact surface of the joint member 25. Likewise, a plain bearing may also be arranged in the holding space of the joint member 25 in the vicinity of the contact surface. Otherwise, as illustrated in FIGS. 9A and 9B, a low-friction surface 28 may also be formed on the contact surface of each of the joint members 24 and 25 by polishing the contact surface. Instead, the low-friction surface 28 may also be attached to the contact surface of each of the joint members 24 and 25 with an adhesive.

The first arm section 8 is connected to the drive unit 1 through the universal joint 16. On the other hand, the second arm section 15 is connected to the body 2 through a joint (or hinge) 29 in such a manner as to pivot around an axis perpendicular to the second arm section 15 (i.e., a vertical axis in FIGS. 7A, 7B, and 7C).

As depicted in FIG. 7A, when the drive unit 1 and the body 2 are vibrated in the vibrating direction (i.e., in the horizontal direction in FIGS. 7A, 7B, and 7C), the first arm section 8 and the second arm section 15 are displaced tangentially with respect to the rotor 21 thereby rotating the rotor 21. In this situation, the rotor 21 is reciprocated linearly (i.e., translationally) with respect to the drive unit 1 and the body 2. According to the example shown in FIGS. 7A, 7B, and 7C, the first arm section 8 is maintained to be contacted to the rotor 21 by the joint member 24, and the second arm section 15 is maintained to be contacted to the rotor 21 by the joint member 25. According to the example shown in FIGS. 7A, 7B, and 7C, the rotor 21 can be rotated and reciprocated certainly by the first arm section 8 and the second arm section 15 to damp the vibrations effectively.

When the drive unit 1 and the body 2 are vibrated in the vertical direction as illustrated in FIGS. 7B and 7C, the first arm section 8 is pivoted around the universal joint 16 to absorb bending stresses applied to the first arm section 8 and the second arm section 15. In this situation, the joint member 24 holding the first arm section 8 therein is pivoted around the pin 26 connecting the joint member 24 to the center of the rotor 21. Therefore, the first arm section 8 may be maintained to be contacted to the rotor 21 even when the drive unit 1 and the body 2 are vibrated in the vertical direction in FIG. 7. For this reason, the rotor 21 may also be rotated and reciprocated certainly by the first arm section 8 and the second arm section 15 to damp the vibrations effectively.

When the drive unit 1 and the body 2 are vibrated in the lateral direction (i.e., perpendicular to the illustrations in FIGS. 7A, 7B, and 7C), the first arm section 8 is pivoted laterally around the universal joint 16 and the second arm section 15 is pivoted laterally around the hinge 29. Therefore, the bending stress applied to the first arm section 8 is absorbed by the universal joint 16, and the bending stress applied to the second arm section 15 is absorbed by the hinge 29.

Figure 10A:
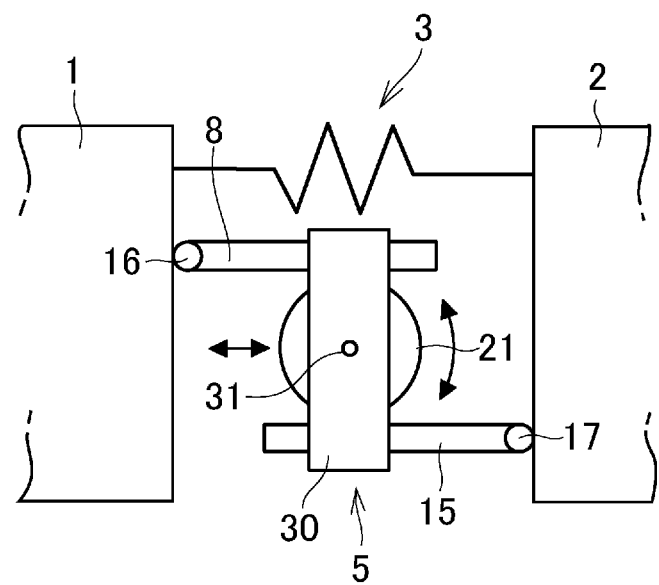
Figure 10B:
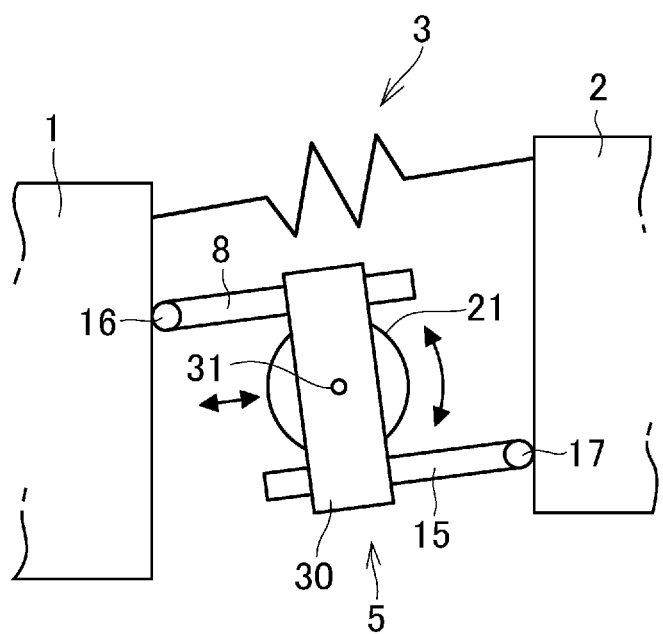
Figure 11A:
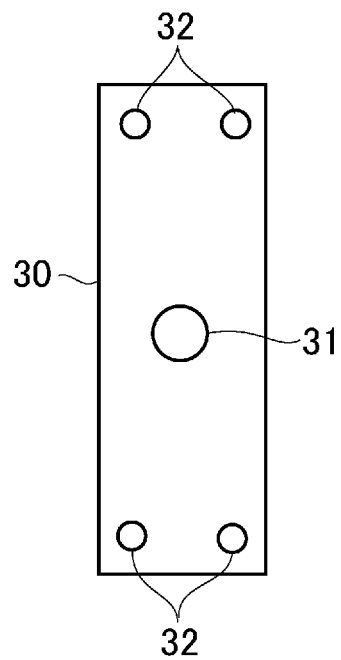
Figure 11B:
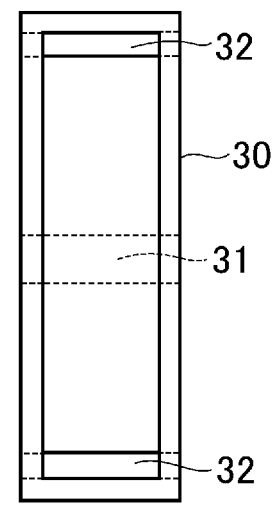

Turning to FIGS. 10A and 10B, there is shown a modification of the example shown in FIGS. 7A, 7B, and 7C in which the joint members 24 and 25 are integrated. In the vibration damper shown in FIGS. 10A and 10B, the first arm section 8 serving as the drive member 22 and the second arm section 15 serving as the drive member 23 are also contacted to or engaged with symmetrical portions of the rotor 21. The first arm section 8, the second arm section 15, and the rotor 21 are held in a holding member 30 so that the first arm section 8 and the second arm section 15 are maintained to be contacted to the rotor 21. As illustrated in FIGS. 11A and 11B, the holding member 30 is a rectangular frame member, and at least one of the first arm section 8 and the second arm section 15 in the holding member 30 is allowed to reciprocate tangentially with respect to the rotor 21. In the holding member 30, the rotor 21 is supported in a pivotal manner by a pin 31 penetrating through a center of the rotor 21 between longer walls of the holding member 30. Inner surfaces of shorter walls of the holding member 30 opposed to each other across the pin 31 individually serve as a guide surface, and the first arm section 8 and the second arm section 15 are guided by the guide surfaces to reciprocate in the vibrating direction. Therefore, in order to reduce frictional resistances between the first arm section 8 and the guide surface and between the second arm section 15 and the guide surface, a plain bearing 32 is arranged in the vicinity of each the guide surfaces.

In the holding member 30, the first arm section 8 and the second arm section 15 are maintained parallel to each other across the rotor 21. To this end, the first arm section 8 is connected to the drive unit 1 through the universal joint 16, and the second arm section 15 is connected to the body 2 through the universal joint 17.

As depicted in FIG. 10A, when the drive unit 1 and the body 2 are vibrated in the direction isolating the drive unit 1 and the body 2 away from each other and bringing the drive unit 1 and the body 2 closer together, the first arm section 8 and the second arm section 15 are reciprocated tangentially with respect to the rotor 21. Consequently, the rotor 21 is rotated around the pin 31 and reciprocated translationally between the drive unit 1 and the body 2. According to the example shown in FIGS. 10A and 10B, therefore, the vibrations may also be damped by the inertial force derived from the rotary motion and translational motion of the rotor 21. As described, in the vibration damper shown in FIGS. 10A and 10B, the first arm section 8 is connected to the drive unit 1 through the universal joint 16, and the second arm section 15 is connected to the body 2 through the universal joint 17. In the vibration damper shown in FIGS. 10A and 10B, therefore, postures of the first arm section 8 and the second arm section 15, that is, relative positions of the first arm section 8 and the second arm section 15 with respect to the rotor 21 will not be changed, even when the drive unit 1 and the body 2 are vibrated in different directions. For example, when the drive unit 1 and the body 2 are displaced relatively in the vertical direction as depicted in FIG. 10B, the first arm section 8 is pivoted around the universal joint 16 and the second arm section 15 is pivoted around the universal joint 17. In this situation, therefore, the first arm section 8 and the second arm section 15 are maintained to be parallel to each other across the rotor 21, and bending stresses applied to the first arm section 8 and the second arm section 15 may be absorbed by such pivotal motions of the first arm section 8 and the second arm section 15. For this reason, the rotor 21 may also be rotated and reciprocated certainly by the first arm section 8 and the second arm section 15 to damp the vibrations effectively.

Figure 12A:
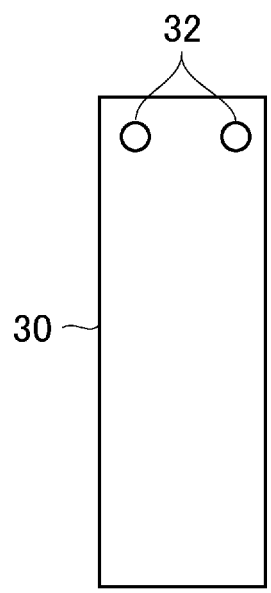
Figure 12B:
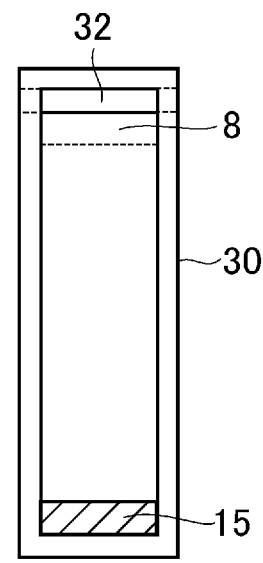

Here will be explained other examples of the holding member 30 for maintaining the first arm section 8 and the second arm parallel to each other across the rotor 21. FIGS. 12A and 12B show another example of the holding member 30. According to another example shown in FIGS. 12A and 12B, the holding member 30 is also a rectangular frame member, and one of the first arm section 8 and the second arm section 15 (e.g., the second arm section 15 in FIG. 12B) is integrated with the holding member 30. The rotor 21 is held in the holding member 30 while being contacted to or engaged with the second arm section 15, and without being supported by the pin 31. That is, in the holding member 30, the rotor 21 is allowed to roll on the second arm section 15.

Figure 13A:
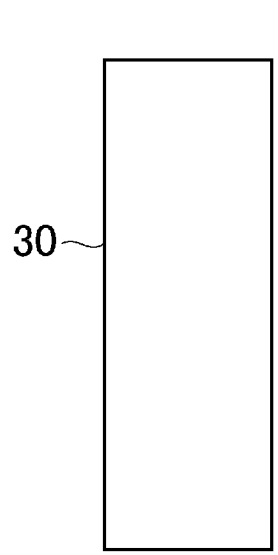
Figure 13B:
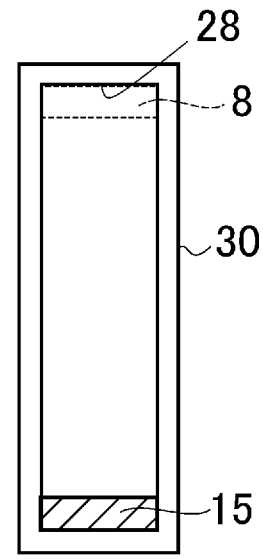

Whereas, the first arm section 8 is inserted between the rotor 21 and the guide surface of the holding member 30 while being contacted to or engaged with the rotor 21 in the opposite side of the second arm section 15. In order to reduce a frictional resistance between the first arm section 8 and the guide surface, and to maintain the first arm section 8 parallel to the second arm section 15 fixed to the holding member 30, the plain bearing 32 is interposed between the first arm section 8 and the guide surface. FIGS. 13A and 13B show still another example of the holding member 30. According to still another example shown in FIGS. 13A and 13B, the low-friction surface 28 is formed on the guide surface instead of the plain bearing 32.

Given that the holding member 30 shown in FIGS. 12A and 12B or FIGS. 13A and 13B is employed in the vibration damper shown in FIGS. 10A and 10B, the rotor 21 and the first arm section 8 are reciprocated relatively to the holding member 30 integrated with the second arm section 15. In this case, the rotor 21 is merely clamped by the first arm section 8 and the second arm section 15 without being connected to any of other members. However, a relative displacement of the rotor 21 with respect to the holding member 30 is approximately half of a relative displacement of the first arm section 8 with respect to the holding member 30. Therefore, the rotor 21 will not be disengaged not only from the holding member 30 but also from the first arm section 8 and the second arm section 15.

Fifth Example

Figure 14:
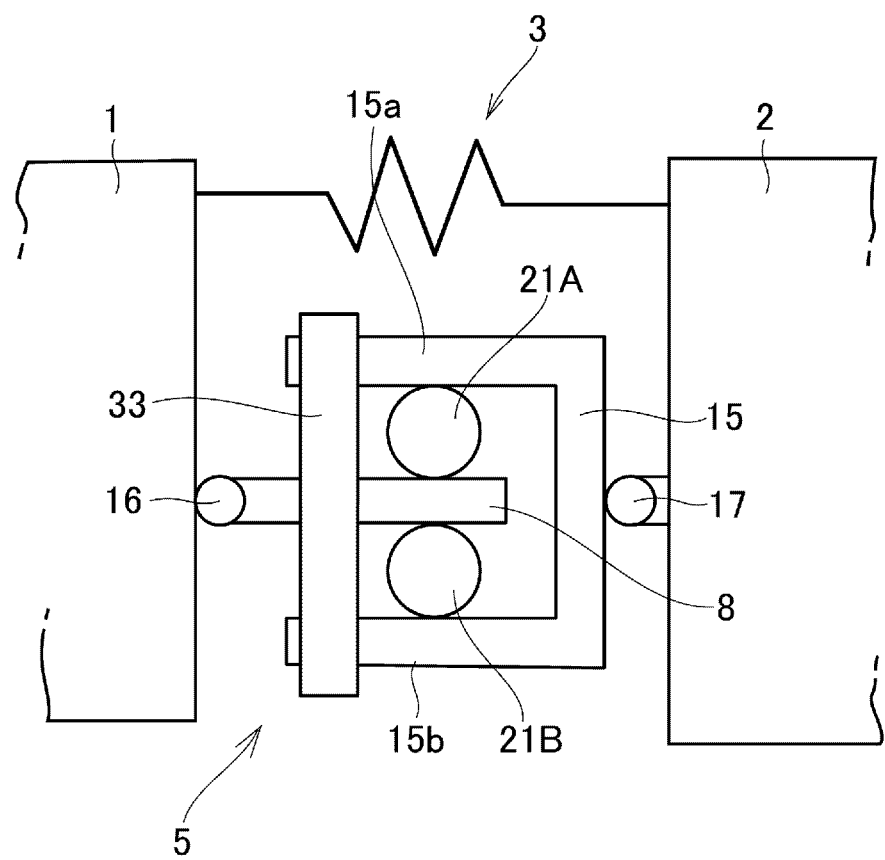
FIG. 14 is a schematic illustration showing a fifth example of the vibration damper according to the present disclosure.

Turning to FIG. 14, there is schematically shown a structure of the vibration damper according to a fifth example. According to the fifth example, the vibration damper is provided with a pair of rotors serving as pinions of a rack-and-pinion mechanism. In the vibration damper shown in FIG. 14, the first arm section 8 serving as the drive member 22 is connected to the drive unit 1 through the universal joint 16 in such a manner as to extend toward the body 2. A first rotor 21A and a second rotor 21B are arranged on both sides of the first arm section 8 (in the vertical direction in FIG. 14) while being contacted frictionally to the first arm section 8 or engaged with the first arm section 8 through gear tooth or the like.

According to the fifth example, the second arm section 15 has a forked structure, and connected to the body 2 through the universal joint 17. Specifically, the second arm section 15 comprises a first branch 15a and a second branch 15b each extending parallel to the first arm section 8. The first rotor 21A is clamped tightly by the first branch 15a and the first arm section 8, and the second rotor 21B is clamped tightly by the second branch 15b and the first arm section 8. That is, the first branch 15a and the first arm section 8 contact with symmetrical portions of the first rotor 21A, and the second branch 15b and the first arm section 8 contact with symmetrical portions of the second rotor 21B.

Figure 15:
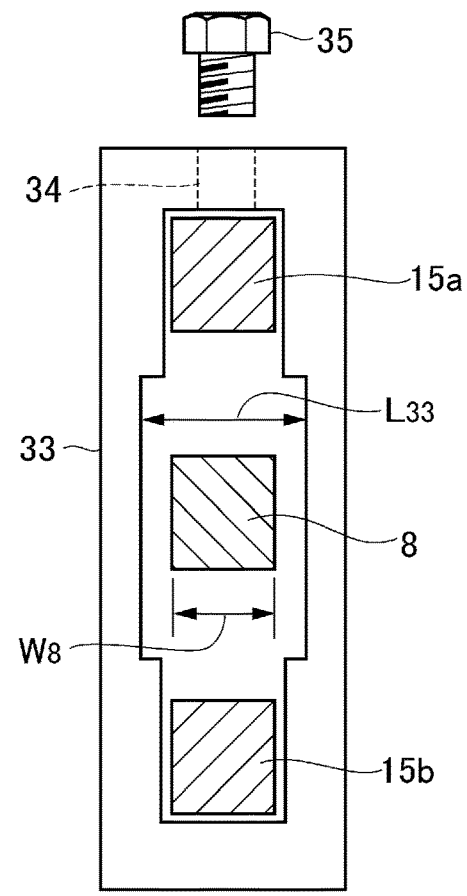
FIG. 15 is a cross-sectional view showing one example of a structure of a fastening member.

One end of the first branch 15a and one end of the second branch 15b are joined to each other through a base rod, and the base rod is connected to the body 2 through the universal joint 17. Whereas, the other ends of the first branch 15a and the second branch 15b are not closed. In order to maintain the first branch 15a and the second branch 15b parallel to each other, and to maintain the first rotor 21A and the second rotor 21B in close contact with the first branch 15a and the second branch 15b, the open end of the second arm section 15 is closed by a fastening member 33. One example of the fastening member 33 is shown in FIG. 15. As illustrated in FIG. 15, the fastening member 33 is a rectangular frame member, and the first branch 15a and the second branch 15b are inserted into width ends of the fastening member 33. Thus, the first branch 15a and the second branch 15b are fastened by the fastening member 33 in such a manner not to be isolated away from each other. In the example shown in FIG. 15, a screw hole 34 is formed on one of shorter walls (i.e., an upper shorter wall in FIG. 15), and an adjuster screw 35 is screwed into the screw hole 34 to adjust a relative position of one of the first branch 15a and the second branch 15b (i.e., the second branch 15b in FIG. 15) with respect to the other one of the first branch 15a and the second branch 15b. In short, a clearance between the first branch 15a and the second branch 15b is adjusted by the adjuster screw 35.

Thus, in order to fasten the first branch 15a and the second branch 15b, the fastening member 33 may be fixed to one of the first branch 15a and the second branch 15b. That is, the fastening member 33 is not necessary to be allowed to move relatively with respect to the first branch 15a and the second branch 15b of the second arm section 15. Whereas, the first arm section 8 must be allowed to move relatively with respect to the fastening member 33 in all directions so as to damp vibrations acting not only in the vertical direction but also in the horizontal direction. In order to allow the first arm section 8 to move relatively with respect to the fastening member 33, an internal dimension $L_{33}$ of an internal space of the fastening member 33 to which the first arm section 8 is inserted is sufficiently wider than a width $W_8$ of the first arm section 8.

In the vibration damper according to the fifth example, the first arm section 8 and the second arm section 15 are reciprocated relatively in opposite directions by the vibrations isolating the drive unit 1 and the body 2 away from each other and bringing the drive unit 1 and the body 2 closer together. Consequently, the first rotor 21A and the second rotor 21B are rotated in opposite directions while being reciprocated linearly between the drive unit 1 and the body 2. According to the fifth example, therefore, the vibrations may also be damped by inertial forces derived from the rotary motions and translational motions of the first rotor 21A and the second rotor 21B. In addition, according to the fifth example, it is not necessary to arrange the plain bearing and the low-friction surface in the vibration damper. According to the fifth example, therefore, a structure of the vibration damper may be simplified.

Sixth Example

Figure 16:
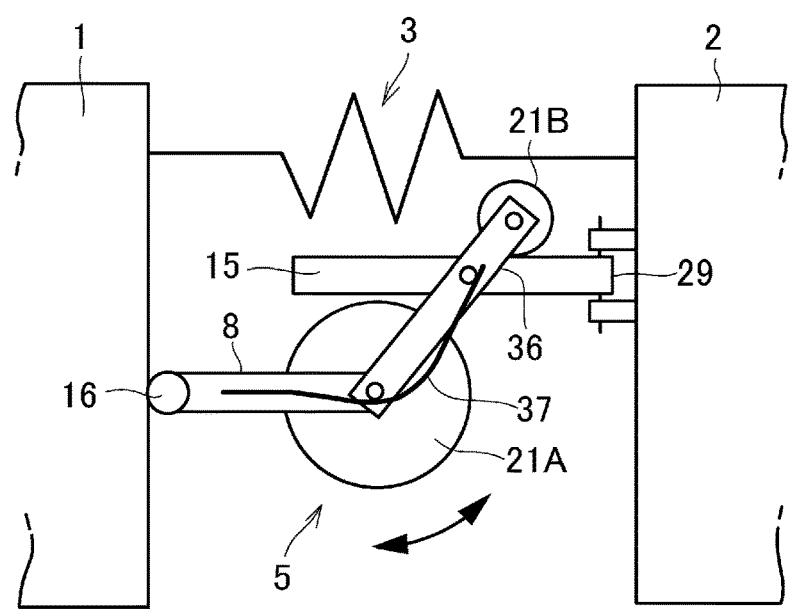
FIG. 16 is a schematic illustration showing a sixth example of the vibration damper according to the present disclosure.

Turning to FIG. 16, there is schematically shown a structure of the vibration damper according to a sixth example. According to the sixth example, the vibration damper is also provided with a pair of rotors. In the vibration damper shown in FIG. 16, one of the rotors is supported by one of the drive unit 1 and the body 2 in a rotatable manner while being contacted to or engaged with an arm attached to the other one of the drive unit 1 and the body 2. Specifically, the first arm section 8 is connected to the drive unit 1 through the universal joint 16 to extend toward the body 2, and the first rotor 21A is attached to the leading end of the first arm section 8 in such a manner as to rotate around an axis perpendicular to the longitudinal direction of the first arm section 8.

Whereas, the second arm section 15 extends from the body 2 toward the drive unit 1, and the leading end of the second arm section 15 is contacted to or engaged with an outer circumferential surface of the first rotor 21A. That is, the second arm section 15 extends tangentially with respect to the first rotor 21A so that the rotor 21A is rotated by a reciprocation of the second arm section 15. Specifically, the second arm section 15 is connected to the body 2 through the hinge 29 in such a manner as to pivot around the axis perpendicular to the longitudinal direction of the second arm section 15, that is, perpendicular to the rotational center axis of the first rotor 21A (i.e., a vertical axis in FIG. 16). In the vibration damper shown in FIG. 16, therefore, a vertical load acting on the second arm section 15 is received by the hinge 29. That is, the second arm section 15 is not allowed to pivot in the vertical direction in FIG. 16.

One end of a lever member 36 is connected to the rotational center of the first rotor 21A in a pivotal manner. The lever member 36 extends diagonally across the second arm section 15, and the second rotor 21B is attached to the other end of the lever member 36 in a pivotal manner while being contacted to an opposite side of the second arm section 15 to the side to which the first rotor 21A is contacted. That is, the second rotor 21B is rotated around an axis parallel to the rotational center axis of the first rotor 21A. According to the sixth example, the second rotor 21B is diametrically smaller than the first rotor 21A. Specifically, outer diameters of the first rotor 21A and the second rotor 21B are set such that the first rotor 21A comes into contact to a lower surface of the second arm section 15, and that the second rotor 21B comes into contact to an upper surface of the second arm section 15. Accordingly, the second rotor 21B whose outer diameter is smaller serves as a roller member of the embodiment of the present disclosure.

In order to apply a rotative force to the lever member 36, a torsion spring 37 is arranged along the first arm section 8 and the lever member 36. The torsion spring 37 may be a shaft-like or string-like elastic member that returns to its initial configuration when it is bent at an angle greater than a predetermined angle. In other words, the torsion spring 37 is adapted to establish a restoring force to return to its initial configuration when it is bent. Specifically, one end of the torsion spring 37 is attached to a predetermined portion of the first arm section 8, an intermediate portion of the torsion spring 37 is attached to a joint portion between the lever member 36 and the first arm section 8, and the other end of the torsion spring 37 is attached to an intermediate portion of the lever member 36. Thus, the torsion spring 37 is arranged such that the lever member 36 is pivoted clockwise in FIG. 16 around one end by the restoring force of the torsion spring 37. In the vibration damper shown in FIG. 16, therefore, the first rotor 21A is pushed onto the lower surface of the second arm section 15 and the second rotor 21B is pushed onto the upper surface of the second arm section 15 by the elastic force of the torsion spring 37.

In the vibration damper according to the sixth example, the first rotor 21A and the second rotor 21B are reciprocated between the drive unit 1 and the body 2 by the vibrations isolating the drive unit 1 and the body 2 away from each other and bringing the drive unit 1 and the body 2 closer together. In this situation, both of the first rotor 21A and the second rotor 21B are maintained in close contact to the second arm section 15 so that the first rotor 21A and the second rotor 21B are rotated along the second arm section 15. According to the fifth example, therefore, the vibrations may also be damped by inertial forces derived from the rotary motions and translational motions of the first rotor 21A and the second rotor 21B. In addition, according to the sixth example, a load and a stress derived from vibrations acting in the vertical direction in FIG. 16 and in the direction perpendicular to the illustrations in FIG. 16 are absorbed by the rotations of the universal joint 16 and the hinge 29. In the vibration damper according to the sixth example, the first rotor 21A and the second rotor 21B come into contact to the second arm section 15 at different point from both sides. Therefore, the second arm section 15 is subjected to a couple of forces from the first rotor 21A and the second rotor 21B. Nonetheless, since the second arm section 15 is connected to the body 2 through the hinge 29 that allows the second arm section 15 to pivot only around the vertical axis, a load derived from the above-mentioned couple of forces applied to the second arm section 15 is received by the hinge 29. Therefore, the vibration damping performance of the vibration damper may be ensured even if the drive unit 1 and the body 2 are vibrated in a direction different from the direction of the vibrations isolating the drive unit 1 and the body 2 away from each other and bringing the drive unit 1 and the body 2 closer together.

Seventh Example

Figure 17:
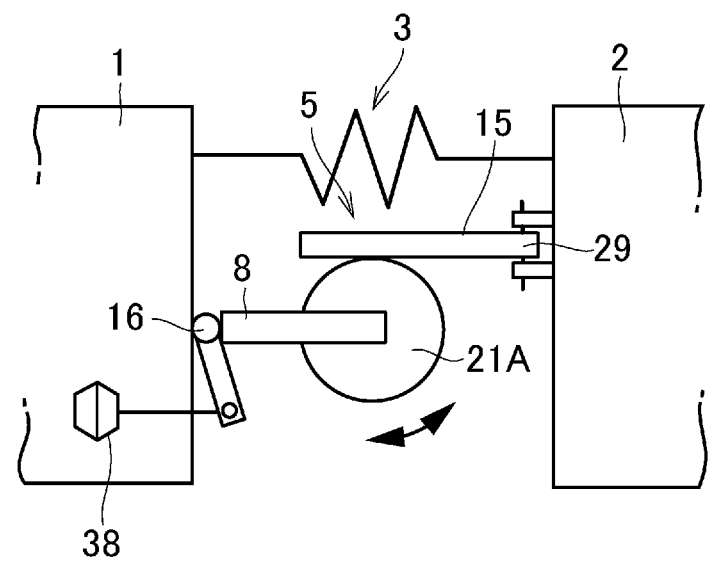
FIG. 17 is a schematic illustration showing a seventh example of the vibration damper according to the present disclosure.

Turning to FIG. 17, there is schematically shown a structure of the vibration damper according to a seventh example. According to the seventh example, in order to ensure the rotary motion and translational motion of the rotor, the rotor is tightly brought into contact to the arm extending from the drive unit 1 or the body 2. In the vibration damper according to the seventh example, a mechanism for selectively bringing the first rotor 21A into contact to the second arm section 15 and isolating the first rotor 21A from the second arm section 15 is employed, instead of the second rotor 21B employed in the vibration damper shown in FIG. 16. The remaining structures of the vibration damper shown in FIG. 17 are similar to those of the vibration damper shown in FIG. 16. According to the seventh example, specifically, the first arm section 8 is bent into an L-shape, and connected to the drive unit 1 at a bent portion through the universal joint 16. The rotor 21A is attached to a leading end of a portion of the first arm section 8 extending from the universal joint 16 toward the body 2 in a rotatable manner, and a linear actuator 38 is connected to a leading end of a portion of the first arm section 8 extending downwardly from the universal joint 16 (i.e., extending in a direction perpendicular to the rotational center axis of the rotor 21A). Specifically, the actuator 38 reciprocates in the direction perpendicular to the rotational center axis of the rotor 21A, or in a direction parallel to the second arm section 15 to pivot the first arm section 8 around the universal joint 16. For example, when the actuator 38 pushes the leading end of the portion of the first arm section 8 extending downwardly toward the right side in FIG. 17, the rotor 21A is pushed onto the second arm section 15 at a predetermined surface pressure. By contrast, when the leading end of the portion of the first arm section 8 extending downwardly is withdrawn by the actuator 38 toward the left side in FIG. 17, the rotor 21A is moved downwardly in FIG. 17 to be detached from the second arm section 15. Thus, in the vibration damper according to the sixth example, the first arm section 8 and the actuator 38 serve as a selective engaging mechanism that selectively brings the rotor 21A into contact to the second arm section 15.

In the condition where the rotor 21A is brought into contact to or engagement with the second arm section 15, the rotor 21A is reciprocated in the horizontal direction in FIG. 17 by the vibrations isolating the drive unit 1 and the body 2 away from each other and bringing the drive unit 1 and the body 2 closer together. That is, the rotor 21A serves as a weight contracting the vibrations. In this situation, the second arm section 15 is reciprocated tangentially with respect to the rotor 21A so that the rotor 21A is rotated by a torque established by the second arm section 15. According to the seventh example, therefore, the vibrations may also be damped by an inertial force derived from the rotary motion and translational motion of the first rotor 21A as the foregoing vibration dampers having rack-and-pinion mechanisms.

In the vibration damper shown in FIG. 17, an angular velocity $\omega$ of the rotor 21A is governed by a spring constant k, and the vibrating damping performance of the vibration damper changes depending on whether the angular velocity $\omega$ is higher or lower than a predetermined value. Therefore, given that the vibration damper shown in FIG. 17 is employed in a vehicle, a contact pressure of the rotor 21A to the second arm section 15 is changed in accordance with a speed of the vehicle or an engine. For example, when a speed of the vehicle having the drive unit 1 is increased thereby increasing the vibrational frequency, a load or pressure of the actuator 38 to push the rotor 21A onto the second arm section 15 is reduced, or the rotor 21A is detached from the second arm section 15 by the actuator 38. Consequently, the rotor 21A no longer acts on the second arm section 15, and the vibrations of high frequency will not increase. Thus, according to the seventh example, it is possible to damp not only the vibrations of low frequency but also the vibrations of high frequency.

Eighth Example

Figure 18A:
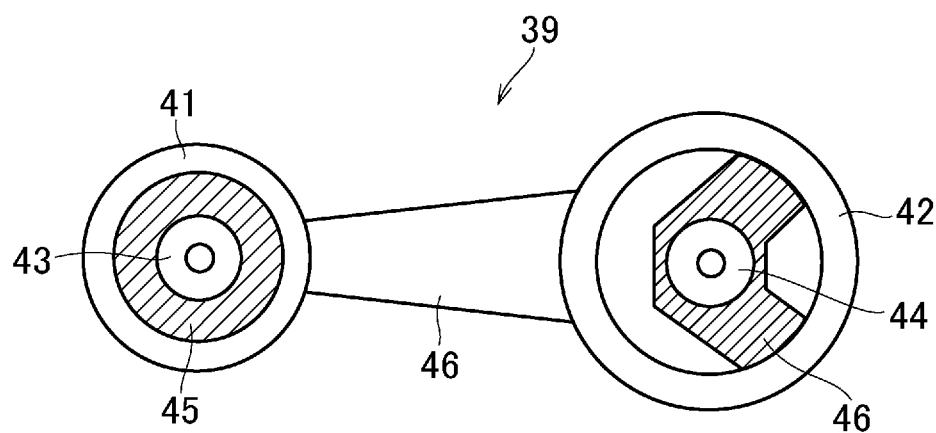
Figure 18B:
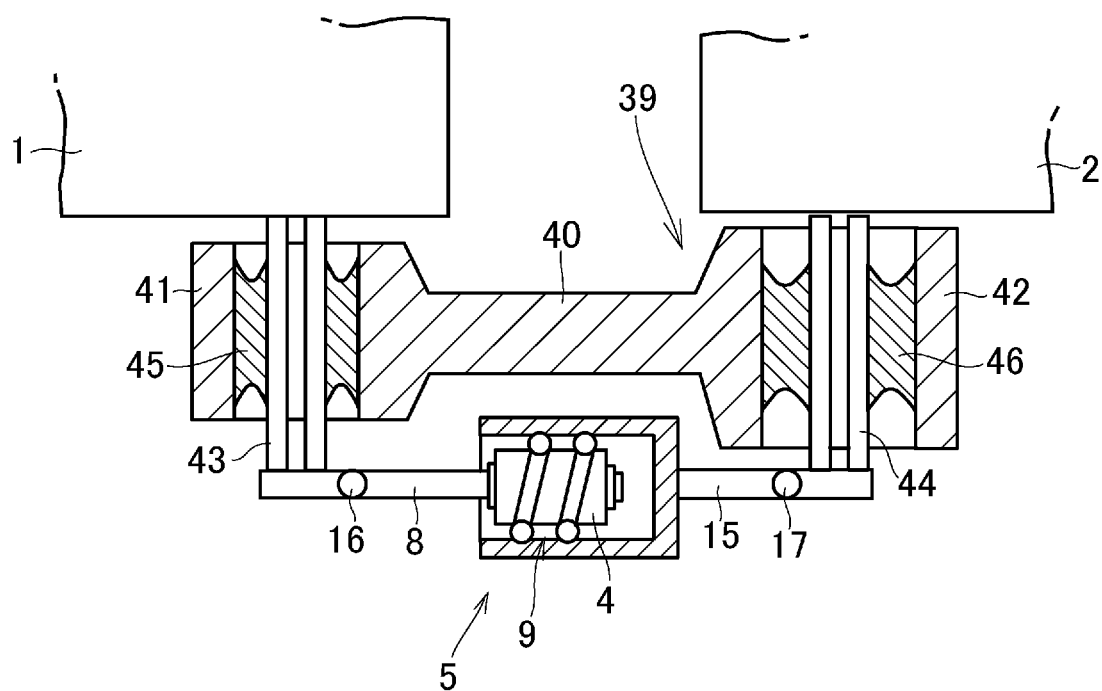

Turning to FIGS. 18A and 18B, there is shown a structure of the vibration damper according to an eighth example. According to the eighth example, the vibration damper is applied to a pendulum engine mount. In the vibration damper shown in FIGS. 18A and 18B, a torque rod 39 is employed as an elastic member, and rotary inertial mass (i.e., a rotor) is arranged parallel to the torque rod 39. Specifically, cylindrical sections 41 and 42 are formed integrally on both ends of a connecting rod 40. An elastic member 45 such as a rubber member is arranged in the cylindrical section 41, and a lateral rod 43 penetrates through the elastic member 45 along a center axis of the cylindrical section 41. Likewise, an elastic member 46 also as a rubber member is arranged in the cylindrical section 42, and a lateral rod 44 penetrates through the elastic member 46 along a center axis of the cylindrical section 42. Thus, the lateral rod 43 and the lateral rod 44 are connected to each other through the elastic members 45 and 46, the cylindrical sections 41 and 42, and the connecting rod 40.

The lateral rod 43 is connected to the drive unit 1, and the lateral rod 44 is connected to the body 2. That is, the elastic members 45 and 46 are interposed between the drive unit 1 and the body 2. In the vibration damper according to the eighth example, the vibration translating mechanism 5 shown in FIGS. 3A and 3B is arranged between the lateral rod 43 and the lateral rod 44, and the rotor 4 is held in the vibration translating mechanism 5 in parallel to the connecting rod 40. Specifically, the lateral rod 43 is connected to the first arm section 8 through the universal joint 16, and a leading end of the first arm section 8 is inserted into the rotor 4 along a rotational center axis of the rotor 4. The rotor 4 is allowed to rotate relatively to the first arm section 8, but the first arm section 8 is not allowed to reciprocate relatively to the rotor 4. On the other hand, the second arm section 15 comprises a cylindrical section holding the rotor 4 therein, and a rod section. The rod section of the second arm section 15 is connected to the lateral rod 44 through the universal joint 17.

In the vibration translating mechanism 5, a thread groove is formed on the outer circumferential surface of the rotor 4, and a thread groove is also formed on the inner circumferential surface of the cylindrical section of the second arm section 15. The thread groove of the rotor 4 and the thread groove of the second arm section 15 are opposed to each other, and a plurality of steel balls are held between those thread grooves while being allowed to roll therebetween. Thus, the feed screw mechanism 9 as a ball screw mechanism is formed of the rotor 4, the cylindrical section of the second arm section 15, and the steel balls.

For example, the vibration damper shown in FIGS. 18A and 18B may be employed in a vehicle in which a crankshaft of an engine extends in the width direction of the vehicle so as to damp vibrations in the longitudinal direction of the vehicle derived from a rotation of the crankshaft. To this end, specifically, the vibration damper shown in FIGS. 18A and 18B is arranged in the vehicle such that the connecting rod 40 and the rotational center axis of the rotor 4 extend in the longitudinal direction of the vehicle. Consequently, the vibrations in the longitudinal direction of the vehicle may be damped effectively by an inertial force derived from the rotary motion and translational motion of the rotor 4. The vibrations derived from operation of the engine act not only in the longitudinal direction but also in the vertical direction and the lateral direction. Nonetheless, in the vibration damper shown in FIGS. 18A and 18B, the first arm section 8 is connected through the universal joint 16 to the lateral rod 43 connected to the engine as the drive unit 1, and the second arm section 15 is connected through the universal joint 17 to the lateral rod 44 connected to the body 2. Therefore, joint sites between the first arm section 8 and the lateral rod 43 and between the second arm section 15 and the lateral rod 44 will not be subjected to an excessive load or stress. For this reason, damages on the arm sections 8 and 15 and the lateral rods 43 and 44 may be limited. For example, the first arm section 8, the rotor 4, and the second arm section 15 would be inclined by the vibrations acting in the vertical direction. However, such inclinations of those members may be reduced to ensure vibration damping performance by elongating the torque rod 39 to widen a clearance between the lateral rods 43 and 44.

Other Examples

Figure 19:
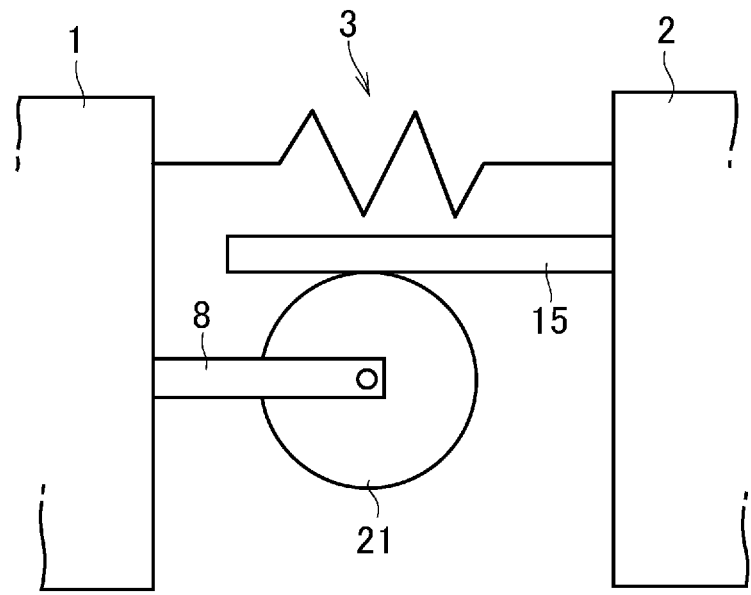
FIG. 19 is a schematic illustration showing another example of the vibration damper having a rack-and-pinion mechanism.

In short, in the vibration damper having the rack-and-pinion mechanism, the rotor 21 is supported in a rotatable manner by one of the arm sections 8 (or 15), and the other one of the arm sections 15 (or 8) is contacted to or engaged with the rotor 21 while being allowed to reciprocate tangentially with respect to the rotor 21. For example, as schematically illustrated in FIG. 19, the rotor 21 may be attached rotatably to the leading end of the first arm section 8 extending from the drive unit 1, and the second arm section 15 extending from the body 2 may be contacted to or engaged with the rotor 21. In the vibration damper shown in FIG. 19, a force Fe received by the drive unit 1 and a force Fb received by the body 2 may be expressed by the following determinant.

$$\begin{pmatrix} F_e \\ F_b \end{pmatrix} = \left\{ m\omega^2 \begin{pmatrix} 0 & 0 \\ 0 & 1 \end{pmatrix} + \left( \frac{I\omega^2}{r^2} - k \right) \begin{pmatrix} 1 & -1 \\ -1 & 1 \end{pmatrix} \right\} \begin{pmatrix} x_e \\ x_b \end{pmatrix}$$

Figure 20:
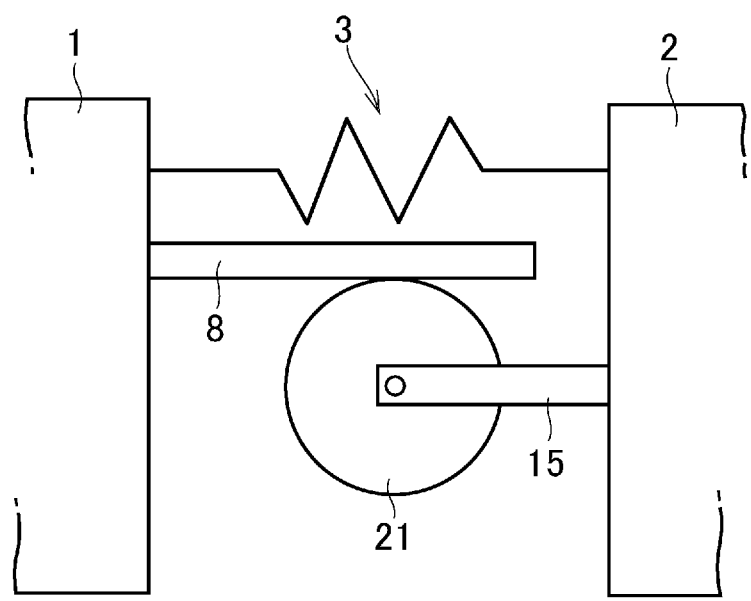
FIG. 20 is a schematic illustration showing still another example of the vibration damper having the rack-and-pinion mechanism.

By contrast, as schematically illustrated in FIG. 20, the rotor 21 may also be attached rotatably to the leading end of the second arm section 15 extending from the body 2, and the first arm section 8 extending from the drive unit 1 may also be contacted to or engaged with the rotor 21. In the vibration damper shown in FIG. 20, a force Fe received by the drive unit 1 and a force Fb received by the body 2 may be expressed by the following determinant.

$$\begin{pmatrix} F_e \\ F_b \end{pmatrix} = \left\{ m\omega^2 \begin{pmatrix} 1 & 0 \\ 0 & 0 \end{pmatrix} + \left( \frac{I\omega^2}{r^2} - k \right) \begin{pmatrix} 1 & -1 \\ -1 & 1 \end{pmatrix} \right\} \begin{pmatrix} x_e \\ x_b \end{pmatrix}$$

In addition, the rack-and-pinion mechanism may be adapted to rotate the rotor around an axis perpendicular to the direction in which the drive unit 1 and the body 2 are isolated away from each other and brought closer together. In this case, the rotor may be formed into a shape having a shaft section supported by one of the arm sections, and a diametrically larger section serving as an inertial mass. Further, the first arm section 8 may also be connected to the body 2, and the second arm section 15 may also be connected to the drive unit 1. That is, structures of the vibration dampers according to the foregoing examples may be reversed horizontally.

What is claimed is:

1. A vibration damper that damps vibrations transmitted between a drive unit that vibrates during power generation and a support body that supports the drive unit, comprising:
    an elastic member that is interposed between the drive unit and the support body;
    a rotary inertial mass that is supported by one of the drive unit and the support body in a rotatable manner to damp the vibrations; and
    a vibration translating mechanism that rotates the rotary inertial mass and reciprocates the rotary inertial mass between the drive unit and the support body, in response to the vibrations acting in a vibrating direction to isolate the drive unit and the support body away from each other and bring the drive unit and the support body closer together,
    wherein the vibration translating mechanism comprises:
        a support member that supports the rotary inertial mass in such a manner as to allow the rotary inertial mass to rotate around an axis along the vibrating direction, but to restrict the rotary inertial mass from reciprocating in the vibrating direction;

a feed screw mechanism having a male thread and a female thread, that rotates the rotary inertial mass around the axis along the vibrating direction by a relative movement between the male thread and the female thread in the vibrating direction;

a first arm section that is arranged between the support member and the one of the drive unit and the support body; and a second arm section that is arranged between one of the male thread and the female thread and the other one of the drive unit and the support body, the other one of the male thread and the female thread is formed on the rotary inertial mass, the support member is joined to a leading end of the first arm section, and inserted into the rotary inertial mass while being allowed to rotate relatively to the rotary inertial mass but restricted from reciprocating relatively to the rotary inertial mass in the vibrating direction, the female thread includes a cylindrical member in which a thread groove is formed on an inner circumferential surface, and is connected to the other one of the drive unit and the support body through the second arm section, and the male thread is formed on an outer circumferential surface of the rotary inertial mass.

* * * * *